United States Patent
Sasaki

(10) Patent No.: US 11,745,515 B2
(45) Date of Patent: Sep. 5, 2023

(54) LIQUID DISCHARGING APPARATUS AND LIQUID DISCHARGING METHOD

(71) Applicant: Itsuro Sasaki, Kanagawa (JP)

(72) Inventor: Itsuro Sasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/512,889

(22) Filed: Oct. 28, 2021

(65) Prior Publication Data

US 2022/0153034 A1    May 19, 2022

(30) Foreign Application Priority Data

Nov. 16, 2020  (JP) .................. 2020-190159

(51) Int. Cl.
*B41J 29/38* (2006.01)
*B41J 2/18* (2006.01)

(52) U.S. Cl.
CPC ....................... *B41J 2/18* (2013.01)

(58) Field of Classification Search
CPC .......................................................... B41J 2/18
See application file for complete search history.

(56) References Cited

U.S. PATENT DOCUMENTS

2020/0276850 A1* 9/2020 Urano .................... B41J 2/2132
2020/0377747 A1   12/2020 Sakaguchi et al.

FOREIGN PATENT DOCUMENTS

| JP | 2004-059857   | 2/2004 |
| JP | 2007-099833   | 4/2007 |
| JP | 2012-046587   | 3/2012 |
| JP | 2019-155858   | 9/2019 |
| JP | 2019-157058   | 9/2019 |
| JP | 2019155858 A * | 9/2019 |

OTHER PUBLICATIONS

Shimizu, Takayuki, White Curable Composition, White Curable Ink, Storage Container, and Liquid Discharge Device, and Liquid Discharging Method, Sep. 19, 2019, Japan, All (Year: 2019).*
U.S. Appl. No. 17/422,516, filed Jan. 21, 2020, Hiromi Sakaguchi, et al.

* cited by examiner

*Primary Examiner* — Justin Seo
*Assistant Examiner* — Tracey M McMillion
(74) *Attorney, Agent, or Firm* — Grüneberg and Myers, PLLC

(57) ABSTRACT

Provided is a liquid discharging apparatus including: a storage storing an ink containing water, an organic solvent, at least two kinds of urethane resins, and titanium oxide; and a liquid discharging head. The liquid discharging head includes an individual liquid chamber having a circulation flow path through which the ink is circulated. The liquid discharging head has a nozzle communicating with the individual liquid chamber and through which a liquid droplet of the ink is discharged. The content of the titanium oxide in the ink is 20% by mass or greater but 30% by mass or less. The volume average particle diameter of the titanium oxide is 300 nm or greater but 630 nm or less.

15 Claims, 9 Drawing Sheets

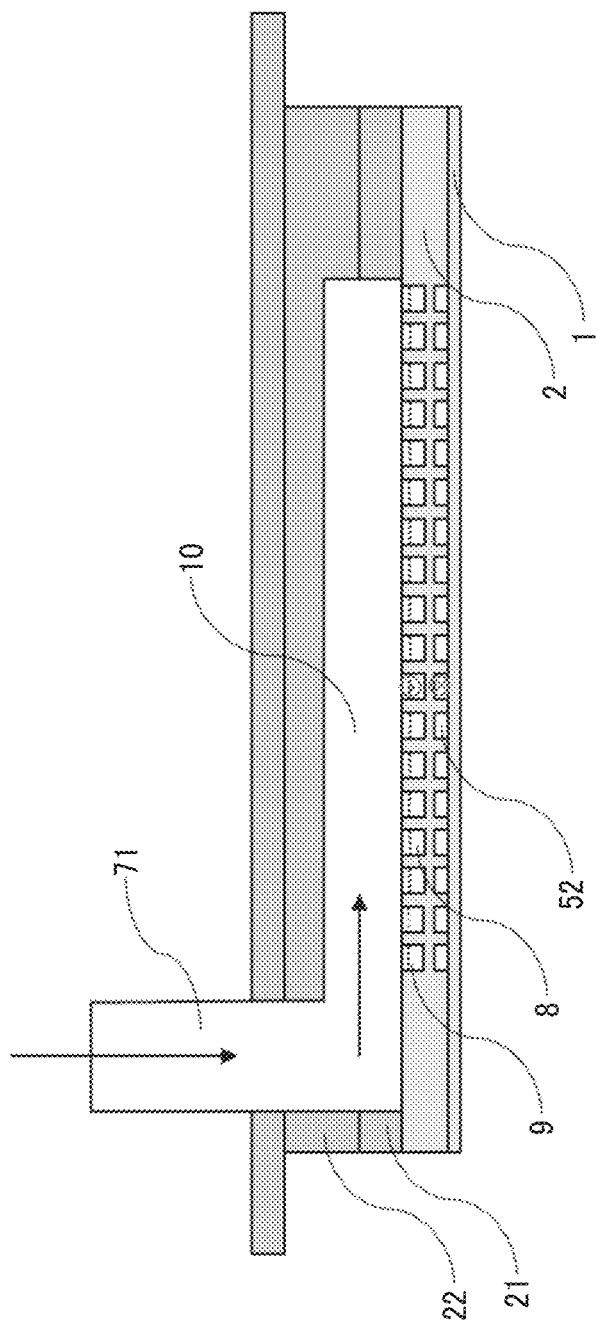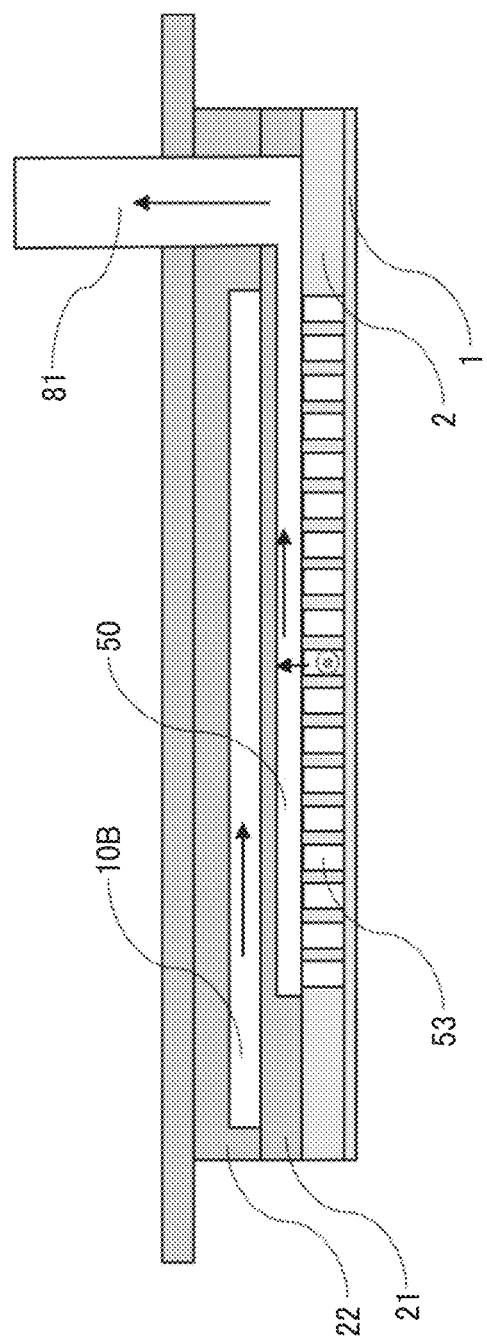

LIQUID DISCHARGING APPARATUS AND LIQUID DISCHARGING METHOD

CROSS-REFERENCE TO RELATED APPLICATIONS

This patent application is based on and claims priority pursuant to 35 U.S.C. § 119(a) to Japanese Patent Application No. 2020-190159, filed on Nov. 16, 2020 in the Japan Patent Office, the entire disclosure of which is hereby incorporated by reference herein.

BACKGROUND

Technical Field

The present disclosure relates to a liquid discharging apparatus and a liquid discharging method.

Description of the Related Art

In the inkjet printing methods used in the printing market in recent years, it is desirable to use a single-pass printing method that can print images at a high speed in order to realize productivity, which cannot be obtained by a multi-pass printing method.

In the single-pass printing method, often used are secured inkjet heads that are cleaned about once every few hours. Hence, there is a need for designing inks that do not deflect and fail to be discharged. Particularly, white inks using white pigments have a high pigment specific gravity. Therefore, if printing apparatuses are suspended for a long period, the pigments settle in the nozzles and the inks cannot be discharged.

SUMMARY

According to one aspect of the present disclosure, a liquid discharging apparatus includes a storage storing an ink containing water, an organic solvent, at least two kinds of urethane resins, and titanium oxide, and a liquid discharging head. The liquid discharging head includes an individual liquid chamber having a circulation flow path through which the ink is circulated. The liquid discharging head has a nozzle communicating with the individual liquid chamber and through which a liquid droplet of the ink is discharged. The content of the titanium oxide in the ink is 20% by mass or greater but 30% by mass or less. The volume average particle diameter of the titanium oxide is 300 nm or greater but 630 nm or less.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 8 is a cross-sectional view of FIG. 2 taken along a line A-A';

FIG. 9 is a cross-sectional view of FIG. 2 taken along a line B-B';

Figure 1:
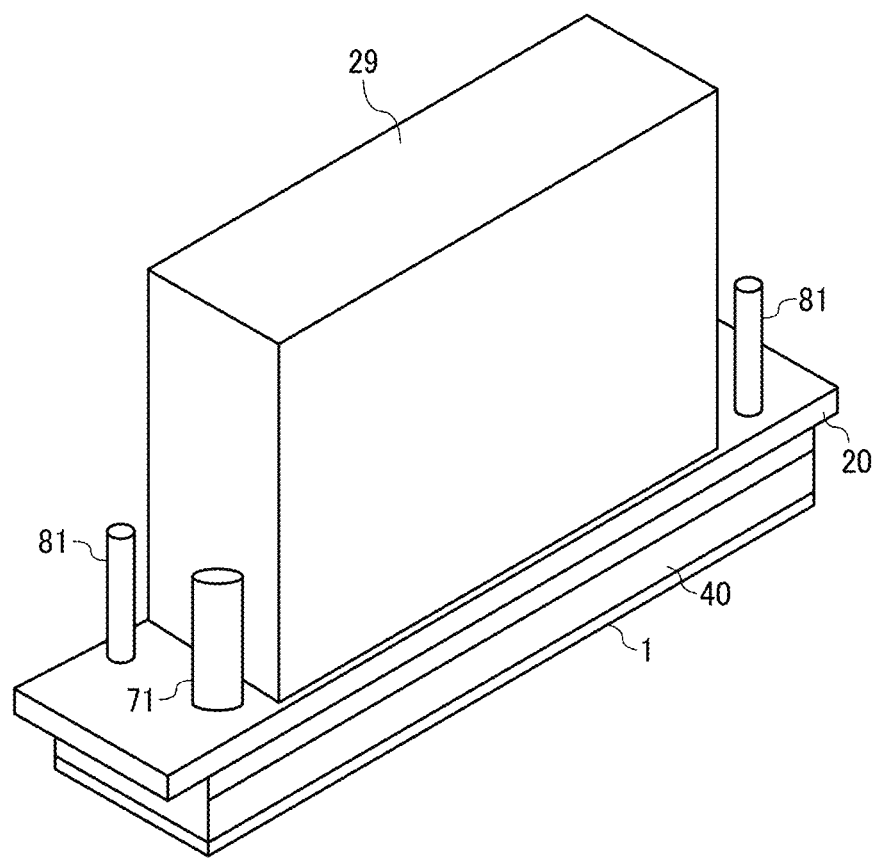
FIG. 1 is an external perspective view illustrating an example of a liquid discharging head of a liquid discharging apparatus of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

In accordance with some embodiments of the present invention, provided is a liquid discharging apparatus that provides images having an excellent hiding power with a high printing stability even with the use of a single-pass printing method.

(Liquid Discharging Apparatus and Liquid Discharging Method)

A liquid discharging apparatus of the present disclosure includes a storage storing an ink, and a liquid discharging head. The ink contains water, an organic solvent, at least two kinds of urethane resins, and titanium oxide. The liquid discharging head includes an individual liquid chamber having a circulation flow path through which the ink is circulated. The liquid discharging head has a nozzle communicating with the individual liquid chamber and through which a liquid droplet of the ink is discharged. The content of the titanium oxide in the ink is 20% by mass or greater but 30% by mass or less. The volume average particle diameter of the titanium oxide is 300 nm or greater but 630 nm or less. The liquid discharging apparatus further includes other units as needed.

A liquid discharging method of the present disclosure includes a discharging step of circulating an ink containing water, an organic solvent, at least two kinds of urethane resins, and titanium oxide in an individual liquid chamber and discharging a liquid droplet of the ink through a nozzle of a liquid discharging head. The content of the titanium oxide in the ink is 20% by mass or greater but 30% by mass or less. The volume average particle diameter of the titanium oxide is 300 nm or greater but 630 nm or less. The liquid discharging method further includes other steps as needed.

The liquid discharging method of the present disclosure can be suitably performed by the liquid discharging apparatus of the present disclosure. The discharging step can be performed by the liquid discharging head. The other steps can be performed by the other units.

The liquid discharging method of the present disclosure and the liquid discharging apparatus of the present disclosure can be suitably used as an inkjet printing method and an inkjet printing apparatus, respectively.

The liquid discharging apparatus and the liquid discharging method of the present disclosure are based on the present inventors' finding that existing inkjet ink compositions containing titanium oxide can be expected to have an improved discharging stability through suppression of settling of titanium oxide, but there is a problem that such inkjet ink compositions cannot exhibit a long-term discharging stability that enables them to be used in a single-pass printing method.

As the result of making earnest efforts, the present inventors have found that the liquid discharging apparatus and the liquid discharging method of the present disclosure can provide a liquid discharging apparatus and a liquid discharging method that provide images having an excellent hiding power with a high printing stability even with the use of a single-pass printing method, and have completed the present invention.

<Ink>

The ink contains water, an organic solvent, at least two kinds of urethane resins, and titanium oxide, and further contains other components as needed.

The ink may be a white ink.

—Titanium Oxide—

The content of the titanium oxide is 20% by mass or greater but 30% by mass or less and preferably 22.5% by mass or greater but 27.5% by mass or less relative to the total amount of the ink.

The volume average particle diameter of the titanium oxide is 300 nm or greater but 630 nm or less, preferably 300 nm or greater but 600 nm or less, and yet more preferably 300 nm or greater but 500 nm or less.

The liquid discharging apparatus of the present disclosure can print images with a high hiding power when an ink containing titanium oxide as a coloring material is used, the content of titanium oxide in the ink is 20% by mass or greater but 30% by mass or less and the volume average particle diameter of the titanium oxide is 300 nm or greater but 630 nm or less. Using such an ink, the liquid discharging apparatus of the present disclosure can provide a liquid discharging apparatus that can print images with a high hiding power with a high printing stability.

—Urethane Resin—

The kind of the urethane resin is not particularly limited so long as at least two kinds of urethane resins are used. Polyurethane resins obtained by allowing a polyol and a polyisocyanate to undergo a reaction can be appropriately selected depending on the intended purpose. Examples of the urethane resin include, but are not limited to, polyether urethane resins, polycarbonate urethane resins, and polyester urethane resins. Because urethane resins have a high compatibility with each other, combined used of at least two kinds of urethane resins makes it possible to obtain coating film uniformity, a good adhesiveness with a recording medium (base material), and an even higher discharging stability.

In terms of improving adhesiveness among these properties, it is more preferable to use a polycarbonate urethane resin and a polyester urethane resin in combination.

Examples of the polyol include, but are not limited to, polyether polyol, polycarbonate polyol, and polyester polyol.

It is preferable that the polyurethane resin contain a polycarbonate polyurethane resin having a glass transition temperature (Tg) of lower than 25 degrees C. in terms of improving adhesiveness.

The glass transition temperature (Tg) of the polyurethane resin can be measured with, for example, a differential scanning calorimeter (TA-60WS and DSC-60, available from Shimadzu Corporation). Specifically, the polyurethane resin (4.0 mg) is put in an aluminum sample container. The sample container is put on a holder unit, and the holder unit is set in an electric furnace. Next, in a nitrogen atmosphere, the polyurethane resin is subjected to temperature elevation from 0 degrees C. to 150 degrees C. at a temperature elevation rate of 10 degrees C./min, then subjected to temperature reduction from 150 degrees C. to −80 degrees C. at a temperature reduction rate of 5 degrees C./min, and then again subjected to temperature elevation to 150 degrees C. at a temperature elevation rate of 10 degrees C./min, to measure a DSC curve. Using the analyzing program of the DSC-60 system, the obtained DSC curve is analyzed by a mid-point method from the inflection point during the second temperature elevation, to obtain the glass transition temperature (Tg).

An appropriately synthesized product or a commercially available product may be used as the urethane resin.

Examples of the commercially available product of the polycarbonate urethane resin include, but are not limited to, SUPERFLEX 650 (available from DKS Co., Ltd., with Tg of 5 degrees C.); and UCOAT UX-310, UCOAT UX-320, UCOAT UX-300, VERMARINE UA-350, and VERMARINE UA-368T (all available from Sanyo Chemical Industries, Ltd.).

——Polyether Polyol——

As the polyether polyol, for example, a product obtained by addition polymerization of a starting material, which is one or two or more kinds of compounds containing two or more active hydrogen atoms, with an alkylene oxide can be used.

As the compound containing two or more active hydrogen atoms, for example, ethylene glycol, diethylene glycol, triethylene glycol, propylene glycol, trimethylene glycol, 1,3-butanediol, 1,4-butanediol, 1,6-hexanediol, glycerin, trimethylolethane, and trimethylolpropane can be used.

As the alkylene oxide, for example, ethylene oxide, propylene oxide, butylene oxide, styrene oxide, epichlorohydrin, and tetrahydrofuran can be used.

As the polyether polyol, it is preferable to use polyoxytetramethylene glycol and polyoxypropylene glycol in terms of obtaining a binder for an inkjet printing ink that can provide a highly excellent scratch resistance.

——Polycarbonate Polyol——

As the polycarbonate polyol, for example, a reaction product of a carbonate and a polyol can be used.

As the carbonate, for example, methyl carbonate, dimethyl carbonate, ethyl carbonate, diethyl carbonate, cyclocarbonate, and diphenyl carbonate can be used.

As the polyol that can react with the carbonate, for example, dihydroxy compounds having a relatively low molecular weight, such as ethylene glycol, diethylene glycol, triethylene glycol, 1,2-propylene glycol, 1,3-propylene glycol, dipropylene glycol, 1,4-butanediol, 1,3-butanediol, 1,2-butanediol, 2,3-butanediol, 1,5-pentanediol, 1,5-hexanediol, 2,5-hexanediol, 1,6-hexanediol, 1,7-heptanediol, 1,8-octanediol, 1,9-nonanediol, 1,10-decanediol, 1,11-undecanediol, 1,12-dodecanediol, 1,4-cyclohexanediol, 1,4-cyclohexanedimethanol, hydroquinone, resorcine, bisphenol-A, bisphenol-F, and 4,4'-biphenol, polyether polyols such as polyethylene glycol, polypropylene glycol, and polyoxytetramethylene glycol, and polyester polyols such as polyhexamethylene adipate, polyhexamethylene succinate, and polycaprolactone can be used.

——Polyester Polyol——

As the polyester polyol, for example, a product obtained by esterification reaction of a low-molecular-weight polyol and a polycarboxylic acid, polyester obtained by ring-opening polymerization of a cyclic ester compound such as ε-caprolactone, and a copolyester formed of these products can be used.

As the low-molecular-weight polyol, for example, ethylene glycol and propylene glycol can be used.

As the polycarboxylic acid, for example, succinic acid, adipic acid, sebacic acid, dodecanedicarboxylic acid, terephthalic acid, isophthalic acid, phthalic acid, and anhydrides or ester-forming derivatives of these acids can be used.

——Polyisocyanate——

Examples of the polyisocyanate used for producing the urethane resin include, but are not limited to, aromatic diisocyanates such as phenylene diisocyanate, tolylene diisocyanate, diphenylmethane diisocyanate, and naphthalene diisocyanate; and aliphatic or alicyclic structure-containing diisocyanates such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, and 2,2,4-trimethylhexamethylene diisocyanate. One of these polyisocyanates may be used alone or two or more of these polyisocyanates may be used in combination.

The content of the urethane resin is not particularly limited, may be appropriately selected depending on the intended purpose, and is preferably 10% by mass or greater but 30% by mass or less and more preferably 15% by mass or greater but 25% by mass or less relative to the total amount of the ink in terms of fixability and ink storage stability.

<Other Inks>

The ink described above and other inks can be used in combination in the liquid discharging apparatus.

The other inks contain water, an organic solvent, a resin, and a coloring material, and further contain other components as needed. Examples of the other inks include, but are not limited to, a cyan ink, a magenta ink, a yellow ink, and a black ink.

For example, water, an organic solvent, a coloring material, a resin, and additives used in the ink and the other inks will be described below (hereinafter, the ink and the other inks may be collectively referred to simply as "inks" when any matters that the inks have in common will be described).

—Water—

The water is not particularly limited and may be appropriately selected depending on the intended purpose. Examples of the water include, but are not limited to, pure water such as ion-exchanged water, ultrafiltrated water, reverse osmotic water, and distilled water; and ultrapure water. One of these kinds of water may be used alone or two or more of these kinds of water may be used in combination.

The content of the water is not particularly limited, may be appropriately selected depending on the intended purpose, and is preferably 10% by mass or greater but 90% by mass or less and more preferably 20% by mass or greater but 60% by mass or less in terms of a drying property and discharging reliability of the liquid composition.

—Organic Solvent—

The organic solvent used in the present disclosure is not particularly limited, and a water-soluble organic solvent can be used. Examples of the water-soluble organic solvent include, but are not limited to, polyvalent alcohols, ethers such as polyvalent alcohol alkyl ethers and polyvalent alcohol aryl ethers, nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate, and ethylene carbonate.

Since the water-soluble organic solvent serves as a humectant and also imparts a good drying property, it is preferable to use an organic solvent having a boiling point of 250 degrees C. or lower.

—Coloring Material—

The ink contains the titanium oxide as a coloring material, and may contain any other coloring material than the titanium oxide in combination.

The coloring materials of the other inks are not particularly limited, and known coloring materials may be appropriately selected depending on the intended purpose.

The coloring material has no particular limit. For example, pigments and dyes are suitable.

The pigment includes inorganic pigments and organic pigments. These can be used alone or in combination. In addition, it is possible to use a mixed crystal.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to iron oxide, calcium carbonate, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of these pigments, pigments having good affinity with solvents are preferable. Also, hollow resin particles and inorganic hollow particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4 (Phthalocyanine Blue), 16, 17:1, 56, 60, and 63; and C.I. Pigment Green 1, 4, 7, 8, 10, 17, 18, and 36.

The type of dye is not particularly limited and includes, for example, acidic dyes, direct dyes, reactive dyes, and basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, C.I. Reactive Black 3, 4, and 35.

To obtain the ink, the pigment is dispersed by, for example, preparing a self-dispersible pigment by introducing a hydrophilic functional group into the pigment, coating the surface of the pigment with resin, or using a dispersant.

To prepare a self-dispersible pigment by introducing a hydrophilic functional group into a pigment, for example, it is possible to add a functional group such as sulfone group and carboxyl group to the pigment (e.g., carbon) to disperse the pigment in water.

To coat the surface of the pigment with resin, the pigment is encapsulated by microcapsules to make the pigment dispersible in water. This can be referred to as a resin-coated pigment. In this case, the pigment to be added to ink is not necessarily wholly coated with resin. Pigments partially or wholly uncovered with resin may be dispersed in the ink unless the pigments have an adverse impact.

To use a dispersant, for example, a known dispersant of a small molecular weight type or a high molecular weight type represented by a surfactant is used to disperse the pigments in ink.

As the dispersant, it is possible to use, for example, anionic surfactants, cationic surfactants, nonionic surfactants, amphoteric surfactants, etc. depending on the pigments.

Also, a nonionic surfactant (RT-100, manufactured by TAKEMOTO OIL & FAT CO., LTD.) and a formalin condensate of naphthalene sodium sulfonate are suitable as dispersants.

These dispersants can be used alone or in combination.

—Pigment Dispersion—

The ink can be obtained by mixing a pigment with materials such as water and organic solvent. It is also possible to mix a pigment with water, a dispersant, etc., first to prepare a pigment dispersion and thereafter mix the pigment dispersion with materials such as water and organic solvent to manufacture ink.

The pigment dispersion is obtained by mixing and dispersing water, pigment, pigment dispersant, and other optional components and adjusting the particle size. It is good to use a dispersing device for dispersion.

The particle diameter of the pigment in the pigment dispersion has no particular limit. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the content is preferably from 0.1 to 50 percent by mass and more preferably from 0.1 to 30 percent by mass.

During the production, coarse particles are optionally filtered off from the pigment dispersion with a filter, a centrifuge, etc. preferably followed by degassing.

—Other Resins—

The ink may contain other resins than the urethane resins.

Specific examples thereof include, but are not limited to, polyester resins, acrylic-based resins, vinyl acetate-based resins, styrene-based resins, butadiene-based resins, styrene-butadiene-based resins, vinyl chloride-based resins, acrylic styrene-based resins, and acrylic silicone-based resins.

Particles of such resins may be also used. It is possible to mix a resin emulsion in which the resin particles are dispersed in water serving as a dispersion medium with materials such as a coloring agent and an organic solvent to obtain ink. The resin particle can be synthesized or is available on the market. It is possible to synthesize the resin particle or obtain from market. These can be used alone or in combination of the resin particles.

Examples of commercially available products obtained from market include, but are not limited to, BONCOAT 5454 (styrene-acrylic resin particles, available from DIC Corporation), SAE-1014 (styrene-acrylic resin particles, available from Zeon Corporation), SAIVINOL SK-200 (acrylic resin particles, available from Saiden Chemical Industry Co., Ltd.), PRIMAL AC-22 and AC-61 (acrylic resin particles, available from Rohm and Haas Company). BONCOAT 4001 (acrylic resin particles, available from DIC Corporation), and NANOCRYL (acrylic resin particles, available from Toyochem Co., Ltd.).

When dispersing the resin particles in an aqueous medium, it is possible to use forcibly-emulsifiable-type resin particles that use a dispersant. However, the dispersant may remain in a coating film and reduce the strength of the coating film. Therefore, so-called self-emulsifiable types that contain an anionic group in a molecular structure thereof are suitable.

In this case, the acid value of the resin particles, or the content of the anionic group in the resin particles is preferably from 5 mgKOH/g through 100 mgKOH/g in terms of water dispersibility, and particularly preferably from 5 mgKOH/mg through 50 mgKOH/mg in terms of imparting excellent scratch resistance and excellent chemical resistance.

Examples of the anionic group include, but are not limited to, a carboxyl group, a carboxylate group, a sulfonic acid group, and a sulfonate group. Among these anionic groups, it is preferable to use a carboxylate group or a sulfonate group that is partially or wholly neutralized with, for example, a basic compound in terms of maintaining a good water dispersion stability. In order to introduce such an anionic group into a resin, it is good to use a monomer containing such an anionic group.

Examples of the basic compound that can be used to neutralize the anionic group include, but are not limited to, ammonia, organic amines such as triethyl amine, pyridine, and morpholine; alkanol amines such as monoethanol amine; and metal basic compounds containing, for example, Na, K, Li, and Ca.

When employing the forcible emulsification method, it is possible to use any of nonionic surfactants and anionic surfactants. However, nonionic surfactants are more preferable because a better water resistance is obtained.

Examples of the nonionic surfactants include, but are not limited to, polyoxyethylene alkyl ethers, polyoxyethylene alkylene alkyl ethers, polyoxyethylene derivatives, polyoxyethylene fatty acid esters, polyoxyethylene polyvalent alcohol fatty acid esters, polyoxyethylene propylene polyols, sorbitan fatty acid esters, polyoxyethylene hydrogenated castor oils, polyoxyalkylene polycyclic phenyl ethers, polyoxyethylene alkylamines, alkylalkanol amides, and polyalkylene glycol (meth)acrylates. Among these nonionic surfactants, polyoxyethylene alkyl ethers, polyoxyethylene fatty acid esters, polyoxyethylene sorbitan fatty acid esters, and polyoxyethylene alkylamines are preferable.

Examples of the anionic surfactants include, but are not limited to, alkyl sulfate ester salts, polyoxyethylene alkyl ether sulfuric acid salts, alkyl benzene sulfonic acid salts, α-olefine sulfonic acid salts, methyl tauric acid salts, sulfosuccinic acid salts, ether sulfonic acid salts, ether carboxylic acid salts, fatty acid salts, naphthalene sulfonic acid formalin condensates, alkyl amine salts, quaternary ammonium salts, alkyl betaines, and alkyl amine oxides. Preferable examples of the anionic surfactants include, but are not limited to, polyoxyethylene alkyl ether sulfuric acid salts and sulfosuccinic acid salts.

The addition amount of the surfactant is preferably 0.1% by mass or greater but 30% by mass or less and more preferably 5% by mass or greater but 20% by mass or less relative to the resins. When the addition amount of the surfactant is 0.1% by mass or greater but 30% by mass or less, the resin emulsion forms a film in a suitable manner, an ink having an excellent adhesive property and an excellent water resistance is obtained, and a printed matter can be used suitably without blocking.

The volume average particle diameter of the resin particle is not particularly limited and can be suitably selected to suit to a particular application. The volume average particle diameter is preferably from 10 to 1,000 nm, more preferably from 10 to 200 nm, and furthermore preferably from 10 to 100 nm to obtain good fixability and image hardness.

The volume average particle diameter can be measured by using a particle size analyzer (Nanotrac Wave-UT151, manufactured by MicrotracBEL Corp.).

The particle diameter of the solid portion in ink has no particular limit and can be suitably selected to suit to a particular application. For example, the maximum frequency in the maximum number conversion is preferably from 20 to 1,000 nm and more preferably from 20 to 150 nm to ameliorate the discharging stability and image quality such as image density. The solid portion includes resin particles, particles of pigments, etc. The particle diameter of the solid portion can be measured by using a particle size analyzer (Nanotrac Wave-UT151, manufactured by MicrotracBEL Corp).

The acid value of the resin particles is not particularly limited, may be appropriately selected depending on the intended purpose, and is preferably 40 mgKOH/g or greater but 150 mgKOH/g or less in terms of water dispersibility and chemical resistance and more preferably 80 mgKOH/g or greater but 120 mgKOH/g or less in terms of discharging reliability. The acid value can be measured with, for example, an automatic potentiometric titrator (available from Kyoto Electronics Manufacturing Co., Ltd.) (JIS K 2501-2003).

The volume average particle diameter of the resin particle is not particularly limited and can be suitably selected to suit to a particular application. The volume average particle diameter is preferably from 10 to 1,000 nm, more preferably from 10 to 200 nm, and furthermore preferably from 10 to 100 nm to obtain good fixability and image hardness.

The volume average particle diameter can be measured by using a particle size analyzer (Nanotrac Wave-UT151, manufactured by MicrotracBEL Corp.).

The content of the other resins is not particularly limited, may be appropriately selected depending on the intended purpose, and is preferably 1% by mass or greater but 30% by mass or less and more preferably 5% by mass or greater but 20% by mass or less relative to the total amount of the ink in terms of fixability and ink storage stability.

However, the ink contains at least two kinds of urethane resins. Therefore, when using the other resins in combination, it is preferable to use resins obtained by using the same kinds of polyols or resins containing the same side chain in terms of compatibility between the resins. When the resins contained are of the same kind, compatibility is increased, making it possible to obtain coating film uniformity, a good adhesiveness with a print medium (base material), and a greater discharging stability.

—Other Components—

Examples of the other components include, but are not limited to, a surfactant, a defoaming agent, a preservative and a fungicide, a corrosion inhibitor, and a pH regulator.

——Surfactant——

Examples of the surfactant are silicone-based surfactants, fluorosurfactants, amphoteric surfactants, nonionic surfactants, anionic surfactants, etc.

The silicone-based surfactant has no specific limit and can be suitably selected to suit to a particular application. Of these, preferred are silicone-based surfactants which are not decomposed even in a high pH environment. Specific examples thereof include, but are not limited to, side-chain-modified polydimethylsiloxane, both end-modified polydimethylsiloxane, one-end-modified polydimethylsiloxane, and side-chain-both-end-modified polydimethylsiloxane. A silicone-based surfactant having a polyoxyethylene group or a polyoxyethylene polyoxypropylene group as a modifying group is particularly preferable because such an agent demonstrates good characteristics as an aqueous surfactant. It is possible to use a polyether-modified silicone-based surfactant as the silicone-based surfactant. A specific example thereof is a compound in which a polyalkylene oxide structure is introduced into the side chain of the Si site of dimethyl siloxane.

Specific examples of the fluoro surfactants include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain. These are particularly preferable because they do not foam easily. Specific examples of the perfluoroalkyl sulfonic acid compounds include, but are not limited to, perfluoroalkyl sulfonic acid and salts of perfluoroalkyl sulfonic acid. Specific examples of the perfluoroalkyl carboxylic acid compounds include, but are not limited to, perfluoroalkyl carboxylic acid and salts of perfluoroalkyl carboxylic acid. Specific examples of the polyoxy alkylene ether polymer compounds having a perfluoroalkyl ether group in its side chain include, but are not limited to, sulfuric acid ester salts of polyoxyalkylene ether polymer having a perfluoroalkyl ether group in its side chain and salts of polyoxyalkylene ether polymers having a perfluoroalkyl ether group in its side chain. Counter ions of salts in these fluorine-based surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides, etc.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The proportion of the surfactant is not particularly limited and can be suitably selected to suit to a particular application. It is preferably from 0.001 to 5 percent by mass and more preferably from 0.05 to 5 percent by mass relative to the total amount of the ink in terms of excellent wettability and discharging stability and improvement on image quality.

——Defoaming Agent——

The defoaming agent has no particular limit. For example, silicone-based defoaming agents, polyether-based defoaming agents, and aliphatic acid ester-based defoaming agents are suitable. These can be used alone or in combination. Of these, silicone-based defoaming agents are preferable to easily break foams.

——Preservatives and Fungicides——

The preservatives and fungicides are not particularly limited. A specific example is 1,2-benzisothiazolin-3-on.

——Corrosion Inhibitor——

The corrosion inhibitor has no particular limit. Examples thereof are acid sulfite and sodium thiosulfate.

——pH Regulator——

The pH regulator has no particular limit. It is preferable to adjust the pH to 7 or higher. Specific examples thereof include, but are not limited to, amines such as diethanol amine and triethanol amine.

The property of the ink is not particularly limited and can be suitably selected to suit to a particular application. For example, viscosity, surface tension, pH, etc., are preferably in the following ranges.

The viscosity of the ink at 25 degrees C. is preferably from 5 to 30 mPa·s and more preferably from 5 to 25 mPa·s to improve print density and text quality and obtain good dischargeability. The viscosity can be measured by, for example, a rotatory viscometer (RE-80L, manufactured by TOKI SANGYO CO., LTD.). The measuring conditions are as follows:

Standard cone rotor (1° 34'×R24)
Sample liquid amount: 1.2 mL
Number of rotations: 50 rotations per minute (rpm)
−25 degrees C.
Measuring time: three minutes The surface tension of the ink is preferably 35 mN/m or less and more preferably 32 mN/m or less at 25 degrees C. in terms that the ink is suitably levelized on a print medium and the drying time of the ink is shortened.

The pH of the ink is preferably from 7 to 12 and more preferably from 8 to 11 in terms of prevention of corrosion of metal materials contacting the ink.

<Liquid Discharging Apparatus>

The liquid discharging apparatus of the present disclosure includes a storage storing an ink and a liquid discharging head. The ink contains water, an organic solvent, at least two kinds of urethane resins, and titanium oxide. The liquid discharging head includes: an individual liquid chamber including a circulation flow path through which the ink is circulated; and a nozzle communicating with the individual liquid chamber and through which a liquid droplet formed of the ink is discharged. The liquid discharging apparatus further includes other members as needed.

It is preferable that the liquid discharging apparatus include a pressure sensor configured to detect the pressure of the ink, and a circulation speed control unit configured to control the circulation speed of the ink, and that the circulation speed control unit control the circulation speed of the ink in a manner that a detected value of the pressure sensor becomes a predetermined value. When a detected value of the pressure sensor is higher than the predetermined value, it is preferable that the circulation speed control unit increase the circulation speed of the ink. In this case, the liquid discharging apparatus can suppress settling of the titanium oxide particles and maintain uniform dispersion.

The predetermined value is a previously set target lower limit value (e.g., lower than half of the pressure in the normal state). When the pressure lowers to the predetermined value, it is possible to control the ink flow rate (or increase the circulation speed of the ink) in a manner that the pressure rises to a target pressure (the pressure in the normal state) at a previously set pressure change rate.

It is preferable that the liquid discharging head include a piezo element configured to cause a liquid droplet of the ink to be discharged from the nozzle.

The pressure sensor is not particularly limited and may be appropriately selected depending on the intended purpose so long as the pressure sensor can detect the pressure of the circulating ink. It is preferable that the liquid discharging head include the piezo element, and that the pressure sensor and the piezo element be formed integrally.

The method for detecting the pressure of the circulating ink is not particularly limited and may be appropriately selected depending on the intended purpose. It is preferable that the piezo element formed integrally with the pressure sensor detect the pressure by applying in the ink discharging direction, a load of a level at which the ink is not discharged.

The timing at which the circulation speed control unit controls the circulation speed of the ink is not particularly limited and may be appropriately selected depending on the intended purpose. The timing may be while the liquid discharging head is discharging the ink or while the liquid discharging head is not discharging the ink, or one or both of these timings. It is preferable that the circulation speed control unit control the circulation speed of the ink while the liquid discharging head is not discharging the ink.

Figure 2:
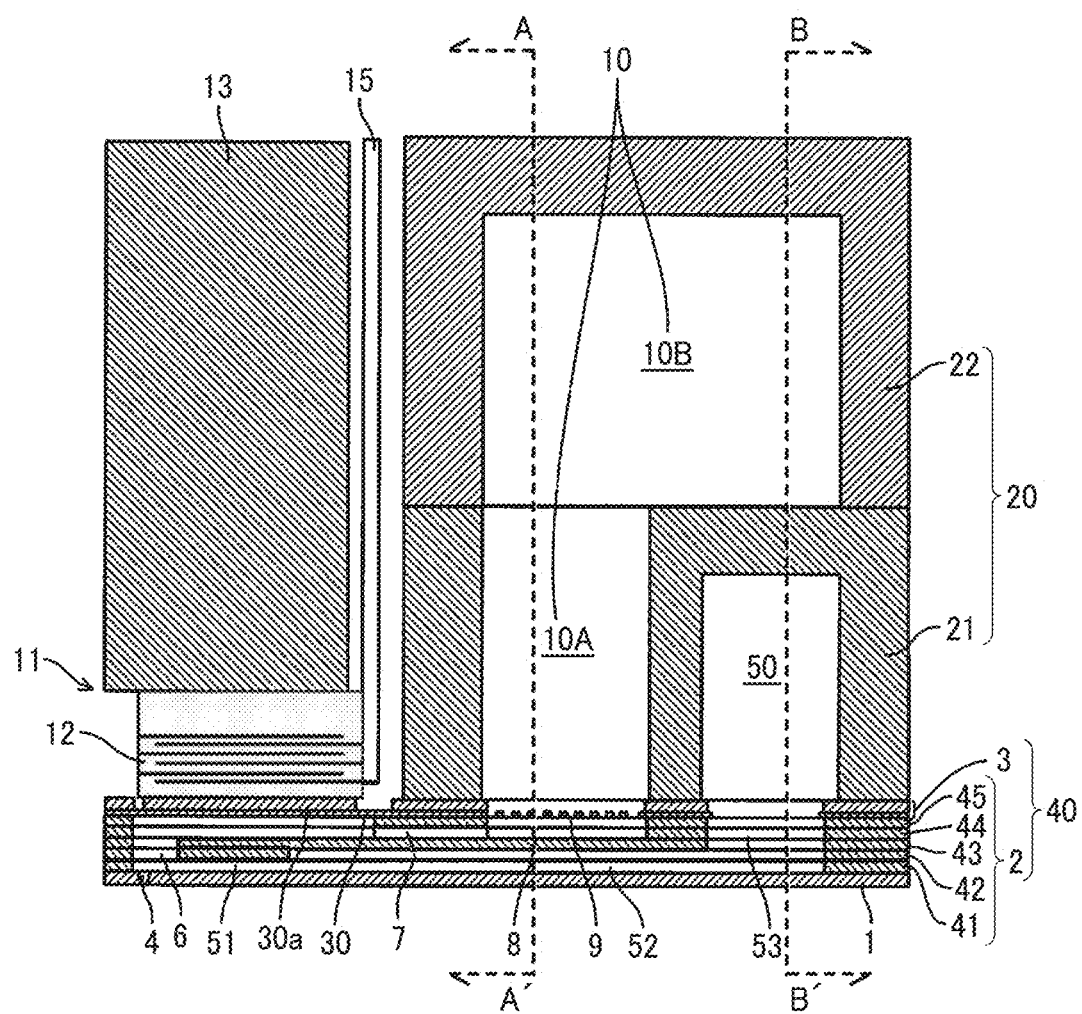
FIG. 2 is a cross-sectional view of a liquid discharging head of a liquid discharging apparatus of the present disclosure, taken along a direction orthogonal to a nozzle arranging direction.
Figure 3:
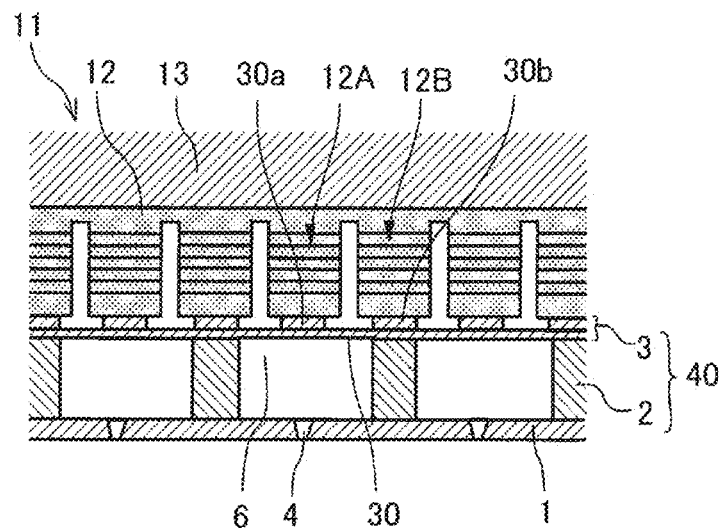
FIG. 3 is a partial cross-sectional view of a liquid discharging head of a liquid discharging apparatus of the present disclosure, taken along a direction parallel with a nozzle arranging direction.
Figure 4:
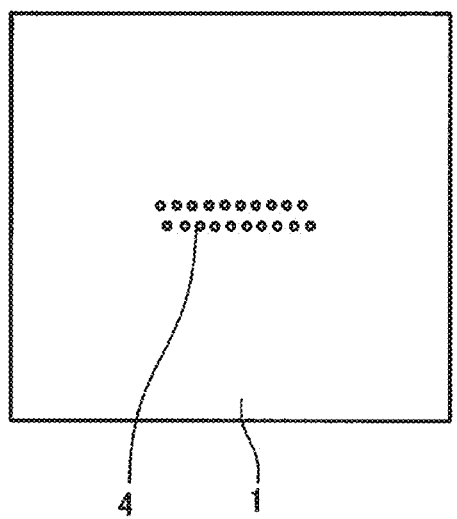
FIG. 4 is a plan view of a nozzle plate of a liquid discharging head of a liquid discharging apparatus of the present disclosure.
Figure 6A:
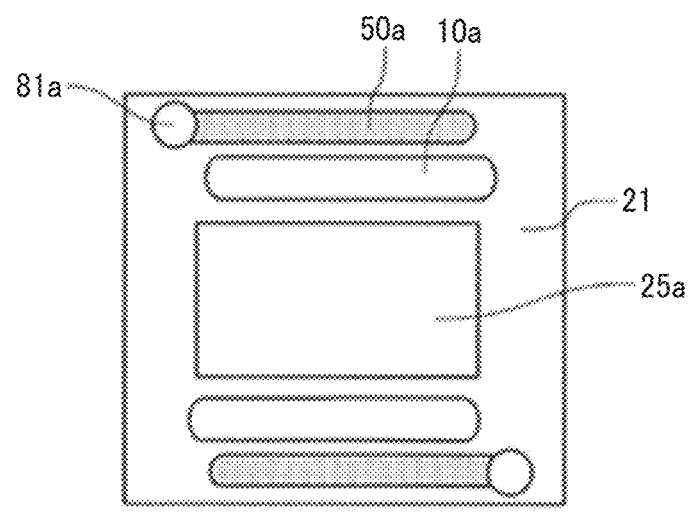
FIG. 6A is a plan view of each member constituting a common liquid chamber member of a liquid discharging head of a liquid discharging apparatus of the present disclosure.
Figure 6B:
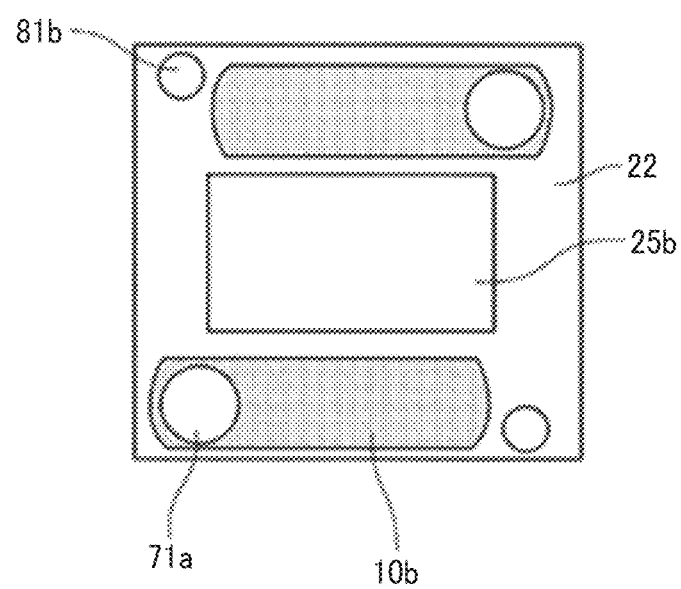
FIG. 6B is a plan view of each member constituting a common liquid chamber member of a liquid discharging head of a liquid discharging apparatus of the present disclosure.
Figure 7:
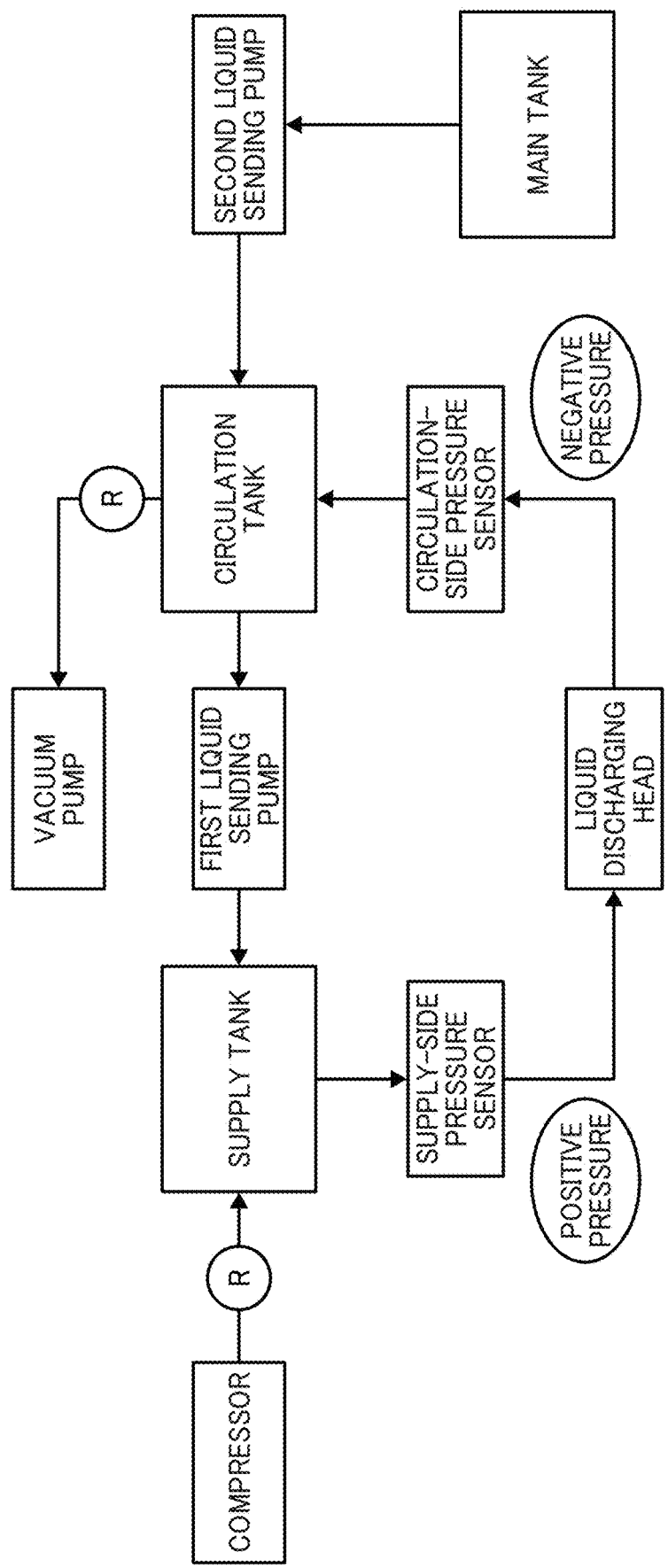
FIG. 7 is a block diagram illustrating an example of a liquid circulation system of the present disclosure.

An example of the liquid discharging head according to an embodiment of the present disclosure will be described with reference to FIG. 1 to FIG. 12. FIG. 1 is an external perspective view of the liquid discharging head according to an embodiment of the present disclosure. FIG. 2 is a cross-sectional view of the liquid discharging head according to an embodiment of the present disclosure, taken along a direction orthogonal to a nozzle arranging direction. FIG. 3 is a cross-sectional view of the liquid discharging head according to an embodiment of the present disclosure, taken along a direction parallel with a nozzle arranging direction. FIG. 4 is a plan view of a nozzle plate of the liquid discharging head according to an embodiment of the present disclosure. FIG. 5A to FIG. 5F are plan views of each member constituting a flow path member of the liquid discharging head according to an embodiment of the present disclosure. FIG. 6A and FIG. 6B are plan views of each member constituting a common liquid chamber member of the liquid discharging head according to an embodiment of the present disclosure. FIG. 7 is a block diagram illustrating an example of a liquid circulation system of the liquid discharging apparatus of the present disclosure. FIG. 8 is a cross-sectional view of FIG. 2 taken along a line A-A'. FIG. 9 is a cross-sectional view of FIG. 2 taken along a line B-B'.

In the liquid discharging head, a nozzle plate 1, a flow path plate 2, and a vibration plate member 3 serving as a wall surface member are laminated and joined to each other. The liquid discharging head includes a piezoelectric actuator 11 configured to displace the vibration plate member 3, a common liquid chamber member 20, and a cover 29.

The nozzle plate 1 has a plurality of nozzles 4 through which a liquid is discharged.

In the flow path plate 2, an individual liquid chamber 6 leading to the nozzle 4, a fluid resistor section 7 leading to the individual liquid chamber 6, and a liquid introducing section 8 leading to the fluid resistor section 7 are formed. In the flow path plate 2, a plurality of plate-shaped members 41 to 45 are laminated from the nozzle plate 1 side and joined to each other. These plate-shaped members 41 to 45 are laminated with and joined to the vibration plate member 3, to constitute a flow path member 40.

The vibration plate member 3 has a filter section 9 serving as an opening via which the liquid introducing section 8 and a common liquid chamber 10 formed by the common liquid chamber member 20 lead to each other.

The vibration plate member 3 is a wall surface member forming a wall surface of the individual liquid chamber 6 in the flow path plate 2. The vibration plate member 3 is a two-layered structure (non-limiting) including, from the flow path plate 2 side, a first layer forming a thin member and a second layer forming a thick member. The first layer has a deformable vibration region 30 at a portion corresponding to the individual liquid chamber 6.

In the nozzle plate 1, a plurality of nozzles 4 are arranged in a staggered state as illustrated in FIG. 4.

Figure 5A:
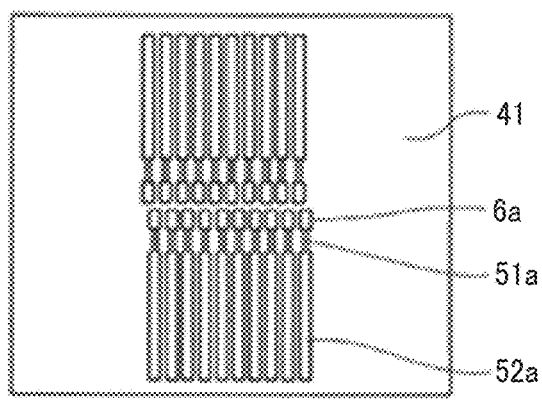
FIG. 5A is a plan view of each member constituting a flow path member of a liquid discharging head of a liquid discharging apparatus of the present disclosure.

In the plate-shaped member 41 constituting the flow path plate 2, through-grooves (i.e., groove-shaped through-holes) 6a constituting the individual liquid chambers 6, and through-grooves 51a and 52a constituting fluid resistor sections 51 and circulation flow paths 52 are formed as illustrated in FIG. 5A.

Figure 5B:
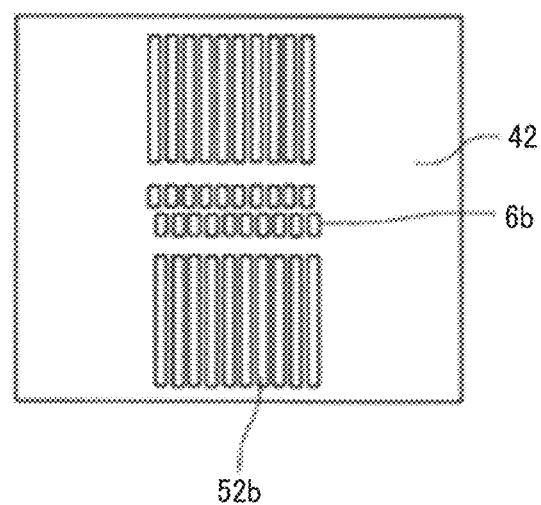
FIG. 5B is a plan view of each member constituting a flow path member of a liquid discharging head of a liquid discharging apparatus of the present disclosure.

Likewise, in the plate-shaped member 42, through-grooves 6b constituting the individual liquid chambers 6, and through-grooves 52b constituting the circulation flow paths 52 are formed as illustrated in FIG. 5B.

Figure 5C:
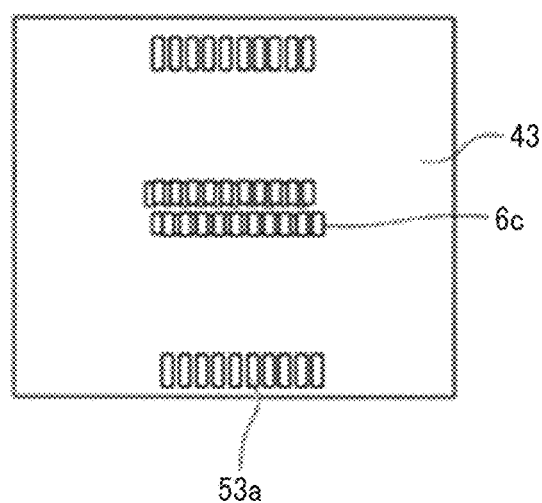
FIG. 5C is a plan view of each member constituting a flow path member of a liquid discharging head of a liquid discharging apparatus of the present disclosure.

Likewise, in the plate-shaped member 43, through-grooves 6c constituting the individual liquid chambers 6, and through-grooves 53a constituting circulation flow paths 53 and having a longer dimension thereof in the nozzle arranging direction are formed as illustrated in FIG. 5C.

Figure 5D:
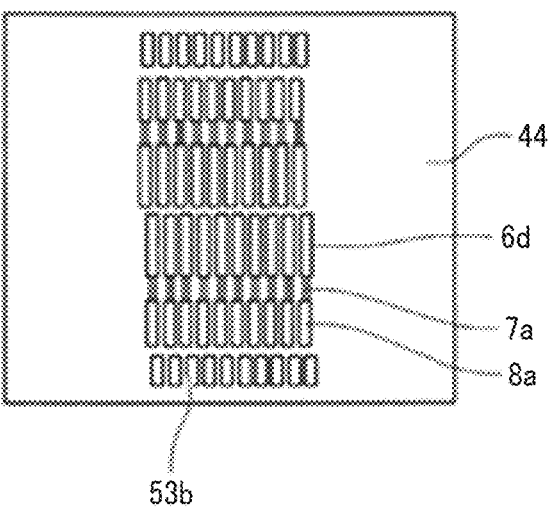
FIG. 5D is a plan view of each member constituting a flow path member of a liquid discharging head of a liquid discharging apparatus of the present disclosure.

Likewise, in the plate-shaped member 44, through-grooves 6d constituting the individual liquid chambers 6, through-grooves 7a constituting the fluid resistor sections 7, through-grooves 8a constituting the liquid introducing sections 8, and through-grooves 53b constituting the circulation flow paths 53 and having a longer dimension thereof in the nozzle arranging direction are formed as illustrated in FIG. 5D.

Figure 5E:
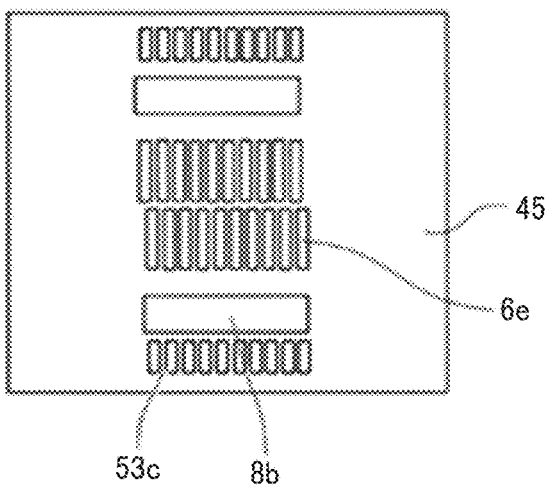
FIG. 5E is a plan view of each member constituting a flow path member of a liquid discharging head of a liquid discharging apparatus of the present disclosure.

Likewise, in the plate-shaped member 45, through-grooves 6e constituting the individual liquid chambers 6, a through-groove 8b (serving as a liquid chamber downstream of a filter) constituting the liquid introducing sections 8 and having a longer dimension thereof in the nozzle arranging direction, and through-grooves 53c constituting the circulation flow paths 53 and having a longer dimension thereof in the nozzle arranging direction are formed as illustrated in FIG. 5E.

Figure 5F:
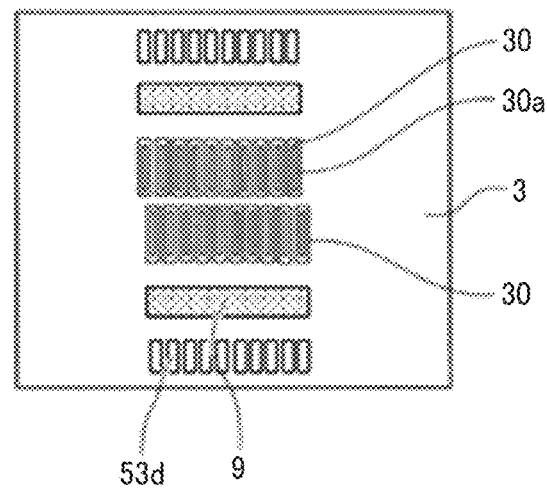
FIG. 5F is a plan view of each member constituting a flow path member of a liquid discharging head of a liquid discharging apparatus of the present disclosure.

In the vibration plate member 3, vibration regions 30, a filter section 9, and through-grooves 53d constituting the circulation flow paths 53 and having a longer dimension thereof in the nozzle arranging direction are formed as illustrated in FIG. 5F.

By forming the flow path member by laminating and joining a plurality of plate-shaped members in this way, it is possible to form complicated flow paths with a simple configuration.

By this configuration, the fluid resistor sections 51 leading to the respective individual liquid chambers 6 and extending along the planar direction of the flow path plate 2, the circulation flow paths 52, and the circulation flow paths 53 leading to the circulation flow paths 52 and extending in the thickness direction of the flow path member 40 are formed in the flow path member 40 formed of the flow path plate 2 and the vibration plate member 3. The circulation flow paths 53 lead to a common circulation liquid chamber 50 described below.

In the common liquid chamber member 20, the common liquid chamber 10 and the common circulation liquid chamber 50 into both of which the ink is supplied from a supply/circulation mechanism 494 (illustrated in FIG. 10) are formed.

In a first common liquid chamber member 21 constituting the common liquid chamber member 20, a piezoelectric actuator through-groove 25a, a through-groove 10a constituting a downstream common liquid chamber 10A, and a bottomed groove 50a constituting the common circulation liquid chamber 50 are formed as illustrated in FIG. 6A.

Likewise, in a second common liquid chamber member 22, a piezoelectric actuator through-groove 25b, and a groove 10b constituting an upstream common liquid chamber 10B are formed as illustrated in FIG. 6B.

Also with reference to FIG. 1, in the second common liquid chamber member 22, a through-hole 71a serving as a supply inlet via which one end of the common liquid chamber 10 in the nozzle arranging direction and a supply port 71 lead to each other is formed.

Likewise, in the first common liquid chamber member 21 and the second common liquid chamber member 22, through-holes 81a and 81b via which the other end of the common circulation liquid chamber 50 in the nozzle arranging direction (the other end being an end opposite to the through-hole 71a) and a circulation port 81 lead to each other are formed.

In FIG. 6A and FIG. 6B, the bottomed grooves are illustrated by solid painting (the same applies in the following drawings).

In this way, the common liquid chamber member 20 is formed of the first common liquid chamber member 21 and the second common liquid chamber member 22. The first common liquid chamber member 21 is joined to the vibration plate member 3 side of the flow path member 40 and the second common liquid chamber member 22 is laminated over and joined to the first common liquid chamber member 21.

In the first common liquid chamber member 21, the downstream common liquid chamber 10A constituting a part of the common liquid chamber 10 and leading to the liquid introducing section 8, and the common circulation liquid chamber 50 leading to the circulation flow path 53 are formed. In the second common liquid chamber member 22, the upstream common liquid chamber 10B constituting a remaining part of the common liquid chamber 10 is formed.

The downstream common liquid chamber 10A constituting a part of the common liquid chamber 10 and the common circulation liquid chamber 50 are disposed side by side in the direction orthogonal to the nozzle arranging direction, and the common circulation liquid chamber 50 is disposed at a position at which it is projected within the common liquid chamber 10.

This makes it possible for the dimension of the common circulation liquid chamber 50 not to be constrained by the dimension needed for the flow paths including the individual liquid chambers 6, the fluid resistor sections 7, and the liquid introducing sections 8 formed in the flow path member 40.

With the common circulation liquid chamber 50 and a part of the common liquid chamber 10 disposed side by side and the common circulation liquid chamber 50 disposed at a position at which it is projected within the common liquid chamber 10, it is possible to save the width of the head in the direction orthogonal to the nozzle arranging direction and save the size of the head. In the common liquid chamber member 20, the common liquid chamber 10 into which the liquid composition is supplied from a head tank and a cartridge, and the common circulation liquid chamber 50 are formed.

The piezoelectric actuator 11 including an electromechanical transducer serving as a driving unit for deforming the vibration region 30 of the vibration plate member 3 is disposed on a surface of the vibration plate member 3 opposite to the individual liquid chamber 6.

As illustrated in FIG. 3, the piezoelectric actuator 11 has a piezoelectric member 12 joined to a base member 13. The piezoelectric member 12 is half-cut-diced and grooved in a manner that one piezoelectric member 12 has a needed number of columnar piezoelectric elements 12A and 12B at predetermined intervals in a comb-teeth shape.

The piezoelectric element 12A is used as a piezoelectric element to be driven by application of a drive waveform, whereas the piezoelectric element 12B is used as a mere support to which no drive waveform is applied. However, all of the piezoelectric elements 12A and 12B may be used as piezoelectric elements to be driven.

The piezoelectric element 12A is joined to a protrusion 30a, which is an island-shaped thick portion formed on the vibration region 30 of the vibration plate member 3. The piezoelectric element 12B is joined to a protrusion 30b, which is a thick portion of the vibration plate member 3.

The piezoelectric member is formed as an alternate laminate of piezoelectric layers and internal electrodes. The internal electrodes are drawn out to end surfaces to serve as an external electrode. A flexible wire member 15 is connected to the external electrode.

In the discharging head having the configuration described above, for example, when the voltage applied to the piezoelectric element 12A is lowered from a reference voltage, the piezoelectric element 12A shrinks, the vibration region 30 of the vibration plate member 3 goes down, and the volume of the individual liquid chamber 6 expands. As a result, the ink flows into the individual liquid chamber 6.

Subsequently, the voltage applied to the piezoelectric element 12A is raised to extend the piezoelectric element 12A in the lamination direction, deform the vibration region 30 of the vibration plate member 3 in the direction toward the nozzle 4, and shrink the volume of the individual liquid chamber 6. As a result, the liquid in the individual liquid chamber 6 is pressurized and the ink is discharged through the nozzle 4.

Then, by the surface tension of the ink, the ink is pulled out from the common liquid chamber 10 for replenishment of the ink. Finally, the meniscus surface stabilizes depending on the balance among the supply tank and the circulation tank, a negative pressure defined by a hydraulic head differential, and the surface tension of the meniscus. This enables shift to the next discharging operation.

The head driving method is not limited to the example described above (pull-push driving). Depending on the method for applying a drive waveform, pull driving and push driving are available. In the embodiment described above, a laminated piezoelectric element is employed to describe a pressure generating unit configured to apply pressure fluctuation to the individual liquid chamber 6. However, this is non-limiting. A thin film-shaped piezoelectric element may be employed. Moreover, application of pressure fluctuation by generation of bubbles by heat generation of a heat resistor disposed in the individual liquid chamber 6, or generation of pressure fluctuation by an electrostatic force may be employed.

Next, an example of a liquid circulation system using the liquid discharging head according to the present embodiment will be described with reference to FIG. 7.

FIG. 7 is a block diagram illustrating a liquid circulation system according to the present embodiment.

As illustrated in FIG. 7, the liquid circulation system includes, for example, a main tank, a liquid discharging head, a supply tank, a circulation tank, a compressor, a vacuum pump, liquid sending pumps, regulators (R), a supply-side pressure sensor, and a circulation-side pressure sensor, and further includes a circulation speed control unit configured to adjust the ink circulation speed in the overall system. The liquid sending pumps may function as the circulation speed control unit. The supply-side pressure sensor is disposed between the supply tank and the liquid discharging head and coupled to a supply flow path leading to the supply port 71 (see FIG. 1) of the liquid discharging head. The circulation-side pressure sensor is disposed between the liquid discharging head and the circulation tank and coupled to a circulation flow path leading to the circulation port 81 (see FIG. 1) of the liquid discharging head.

One side of the circulation tank is coupled to the supply tank via the first liquid sending pump, and the other side of the circulation tank is coupled to the main tank via the second liquid sending pump. Hence, the ink flows into the liquid discharging head from the supply tank through the supply port 71 and is let out into the circulation tank through the circulation port and sent from the circulation tank into the supply tank by the first liquid sending pump. In this way, the ink is circulated.

The compressor is coupled to the supply tank, and the supply tank is controlled in a manner that a predetermined positive pressure is sensed by the supply-side pressure sensor. On the other hand, a vacuum pump is coupled to the circulation tank, and the circulation tank is controlled in a manner that a predetermined negative pressure is sensed by the circulation-side pressure sensor. This makes it possible to circulate the liquid through the discharging head and keep the negative pressure of the meniscus constant.

When liquid droplets are discharged through the nozzles of the liquid discharging head, the amounts of the ink in the supply tank and the circulation tank decrease. Hence, it is preferable to replenish the circulation tank with the ink from the main tank, appropriately using the second liquid sending pump from the main tank. The timing at which the circulation tank is replenished with the liquid from the main tank can be controlled based on a sensing result of, for example, a liquid surface sensor provided inside the circulation tank, in a manner that, for example, the circulation tank is replenished with the ink when the liquid surface height of the ink in the circulation tank falls below a predetermined height.

Next, circulation of the ink through the liquid discharging head will be descried. As illustrated in FIG. 1, the supply port 71 leading to the common liquid chamber and the circulation port 81 leading to the common circulation liquid chamber 50 are formed at ends of the common liquid chamber member 20. The supply port 71 and the circulation port 81 are coupled to the supply tank and the circulation tank (see FIG. 7) storing the ink through tubes respectively. The liquid stored in the supply tank is supplied into the individual liquid chamber 6 through the supply port 71, the common liquid chamber 10, the liquid introducing section 8, and the fluid resistor section 7.

The liquid in the individual liquid chamber 6 is discharged through the nozzle 4 in response to driving of the piezoelectric element 12. On the other hand, the ink remaining inside the individual liquid chamber 6 without being discharged is partially or wholly circulated into the circulation tank through the fluid resistor section 51, the circulation flow paths 52 and 53, the common circulation liquid chamber 50, and the circulation port 81.

It is possible to circulate the ink not only during the operation of the liquid discharging head but also during suspension of the operation. It is preferable to circulate the liquid during suspension of the operation because the liquid in the individual liquid chamber can be refreshed constantly and the components contained in the ink can be suppressed from coagulation and settling.

When the ink contains titanium oxide particles that tend to settle as in the present disclosure, the particles may settle or adhere in the circulation flow path if the circulation speed of the ink is low. This increases the resistance in the circulation flow path, and the value to be detected by the supply-side pressure sensor or the circulation-side pressure sensor becomes low. In such a case, it is possible to overcome the settled matter by controlling the circulation speed of the ink to be higher.

Specifically, when the value detected by the supply-side pressure sensor or the circulation-side pressure sensor falls to a previously set target lower limit value (for example, lower than the half of the pressure in the normal state), the flow rate is controlled in a manner that a detected pressure is increased to a target pressure (the pressure in the normal state) at a previously set pressure change rate. Until before a predetermined time passes from when a detected value has reached the target pressure, the increased flow rate is maintained. As a result, the settled matter can be overcome.

Figure 10:
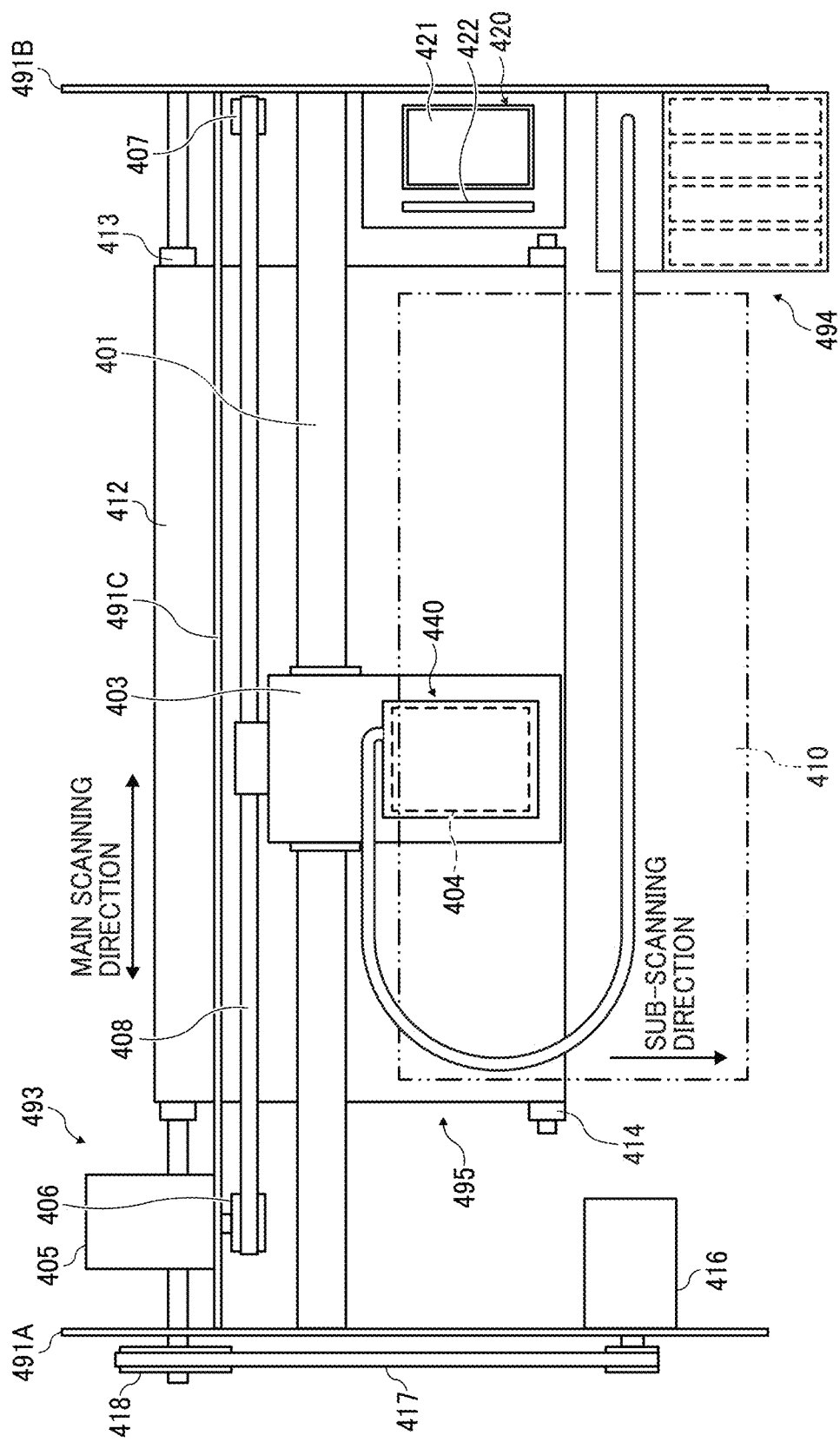
FIG. 10 is a plan view of main parts, illustrating an example of a liquid discharging apparatus of the present disclosure.
Figure 11:
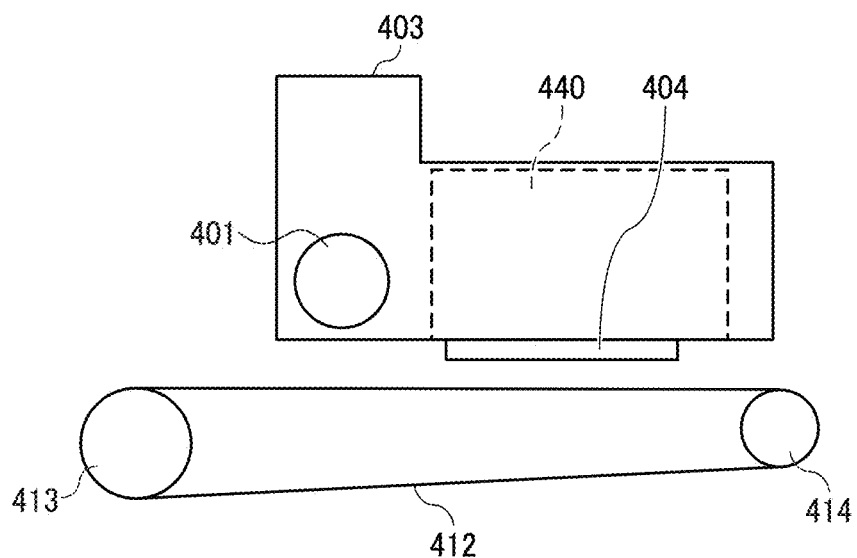
FIG. 11 is a side view of main parts, illustrating an example of a liquid discharging apparatus of the present disclosure.

Next, an example of a liquid discharging apparatus of the present disclosure will be described with reference to FIG. 10 and FIG. 11. FIG. 10 is a plan view of main parts of the liquid discharging apparatus. FIG. 11 is a side view of main parts of the liquid discharging apparatus.

The liquid discharging apparatus is a serial-type apparatus, and a main scanning moving mechanism 493 reciprocably moves a carriage 403 in the main scanning direction. The main scanning moving mechanism 493 includes, for example, a guide member 401, a main scanning motor 405, and a timing belt 408. The guide member 401 is passed in a bridging manner between left and right side panels 491A and 491B to hold the carriage 403 in a movable manner. The main scanning motor 405 reciprocably moves the carriage 403 in the main scanning direction via the timing belt 408 passed in a bridging manner between a driving pulley 406 and a driven pulley 407.

The carriage 403 is mounted with a liquid discharging unit 440 mounted with a liquid discharging head 404 of the present disclosure. The liquid discharging head 404 of the liquid discharging unit 440 is configured to discharge liquid compositions of, for example, yellow (Y), cyan (C), magenta (M), and black (K). The liquid discharging head 404 is mounted in a manner that nozzle lines including a plurality of nozzles extend in the sub-scanning direction orthogonal to the main scanning direction and the discharging direction is downward.

A supply/circulation mechanism 494 configured to supply the liquid composition stored outside the liquid discharging head 404 into the liquid discharging head 404 supplies and circulates the liquid composition into and through the liquid discharging head 404. In the present example, the supply/circulation mechanism includes, for example, a supply tank, a circulation tank, a compressor, a vacuum pump, liquid sending pumps, and regulators (R). A supply-side pressure sensor is disposed between the supply tank and the liquid discharging head and coupled to a supply flow path leading to the supply port 71 of the liquid discharging head. A circulation-side pressure sensor is disposed between the liquid discharging head the circulation tank and coupled to a circulation flow path leading to the circulation port 81 of the liquid discharging head.

The apparatus includes a conveying mechanism 495 configured to convey a sheet 410. The conveying mechanism 495 includes a conveying belt 412 serving as a conveying unit, and a sub-scanning motor 416 configured to drive the conveying belt 412.

The conveying belt 412 attracts a sheet 410 and conveys the sheet 410 at a position counter to the liquid discharging head 404. The conveying belt 412 is an endless belt, and passed between a conveying roller 413 and a tension roller 414. Attraction can be performed by, for example, electrostatic attraction or air suction.

The conveying belt 412 rotates and moves in the sub-scanning direction along with the conveying roller 413 being driven to rotate by the sub-scanning motor 416 via a timing belt 417 and a timing pulley 418.

A maintenance/repair mechanism 420 configured to maintain and repair the liquid discharging head 404 is disposed at one end in the main scanning direction of the carriage 403 in a manner to adjoin the conveying belt 412.

The maintenance/repair mechanism 420 includes, for example, a cap member 421 configured to cap the nozzle surface (a surface in which nozzles are formed) of the liquid discharging head 404, and a wiper member 422 configured to wipe the nozzle surface.

The main scanning moving mechanism 493, the supply/circulation mechanism 494, the maintenance/repair mechanism 420, and the conveying mechanism 495 are attached on the housing including the side panels 491A and 491B and a back panel 491C.

In the apparatus having the configuration described above, a sheet 410 is fed and attracted to the conveying belt 412 and conveyed in the sub-scanning direction along with the rotation movement of the conveying belt 412.

Here, the liquid discharging head 404 is driven in accordance with an image signal while the carriage 403 is moved in the main scanning direction. In this way, the liquid composition is discharged and an image is formed over the sheet 410 that is being stopped.

Because the apparatus includes the liquid discharging head of the present disclosure, it can form high-quality images stably.

Figure 12:
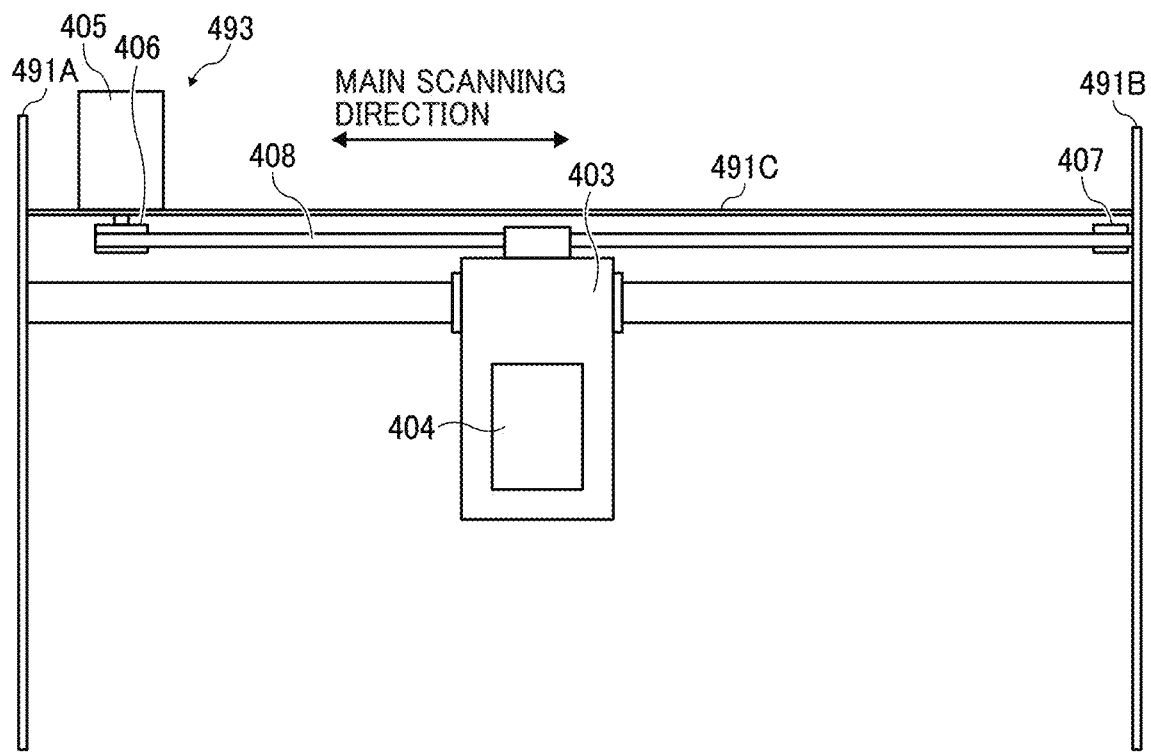
FIG. 12 is a plan view of main parts, illustrating another example of a liquid discharging unit of a liquid discharging apparatus of the present disclosure.

Next, another example of a liquid discharging unit of the present disclosure will be described with reference to FIG. 12. FIG. 12 is a plan view of main parts of the liquid discharging unit.

This liquid discharging unit is formed of: the housing part, which is formed of the side panels 491A and 491B and the back panel 491C; the main scanning moving mechanism 493; the carriage 403; and the liquid discharging head 404 among the members that constitute the apparatus configured to discharging the liquid composition.

This liquid discharging unit may be configured as a liquid discharging unit further mounted with at least one of the maintenance/repair mechanism 420 and the supply/circulation mechanism 494 described above on, for example, the side panel 491B.

In the present disclosure, a "liquid discharging head" is a functional part configured to discharge an ink as a liquid composition through nozzles.

The liquid composition to be discharged needs at least to have a viscosity and a surface tension that enable the liquid composition to be discharged from the head and is not particularly limited. However, it is preferable that the viscosity of the liquid composition become 30 mPa·s or lower at normal temperature and normal pressure or by heating or cooling. More specifically, the liquid composition is, for example, a solution, a suspension, or an emulsion containing, for example, a solvent such as water and an organic solvent, a colorant such as a dye and a pigment, a function imparting material such as a polymerizable compound, a resin, and a surfactant, a biocompatible material such as DNA, amino acid, protein, and calcium, and an edible material such as a natural pigment. Such a liquid composition can be used for uses such as an inkjet ink and a surface processing fluid.

Examples of the energy generation source for discharging the liquid composition include, but are not limited to, a piezoelectric actuator (a laminated piezoelectric element and a thin film-shaped piezoelectric element), a thermal actuator employing an electrothermal transducer such as a heating resistor, and an electrostatic actuator formed of a vibration plate and a counter electrode.

A "liquid discharging unit" is an integrated body of a liquid discharging head with functional parts and mechanisms, and is an assembly of parts involved in discharging of the liquid composition. Examples of the "liquid discharging unit" include, but are not limited to, a combination of the liquid discharging head with at least one of the supply/circulation mechanism, the carriage, the maintenance/recovery mechanism, and the main scanning moving mechanism.

Integration means, for example, the liquid discharging head, and the functional parts and mechanisms being secured to each other by, for example, fastening, bonding, and locking, and one of the discharging head, and the functional parts and mechanisms being supported by the other in a movable manner. The liquid discharging head, and the functional parts and mechanisms may be attachable and detachable from each other.

Examples of the liquid discharging unit include, but are not limited to, an integrated body of the liquid discharging head with the supply/circulation mechanism, and an integrated body of the liquid discharging head with the supply/circulation mechanism by mutual coupling through, for example, tubes. A unit including a filter may be added between the supply/circulation mechanism and the liquid discharging head of such a liquid discharging unit.

Examples of the liquid discharging unit include, but are not limited to, an integrated body of the liquid discharging head with the carriage.

Examples of the liquid discharging unit include, but are not limited to, an integrated body of the liquid discharging head with a scanning moving mechanism, realized by the liquid discharging head being supported movably on a guide member constituting a part of the scanning moving mechanism.

Examples of the liquid discharging unit include, but are not limited to, an integrated body of the liquid discharging head with the carriage and the maintenance/repair mechanism, realized by the cap member constituting a part of the maintenance/repair mechanism being secured to the carriage mounted with the liquid discharging head.

Examples of the liquid discharging unit include, but are not limited to, an integrated body of the liquid discharging head with the supply mechanism, realized by a tube being coupled to the supply/circulation mechanism or to the liquid discharging head including flow path members. The liquid composition in a liquid storage is supplied into the liquid discharging head through this tube.

Examples of the main scanning moving mechanism include, but are not limited to, a guide member alone. Examples of the supply mechanism include, but are not limited to, a tube alone and a part to be mounted alone.

In the present disclosure, a "liquid discharging apparatus" is an apparatus including a liquid discharging head or a liquid discharging unit and configured to drive the liquid discharging head to discharge an ink serving as a liquid composition. Examples of an apparatus configured to discharge a liquid composition include, but are not limited to, an apparatus that can discharge a liquid composition to an article to which the liquid composition can attach, and an apparatus configured to discharge a liquid composition into the air or into a liquid.

The "liquid discharging apparatus" may further optionally include a device relating to feeding, conveying, and ejecting the article to which the liquid composition can attach and other devices referred to as a pre-processing device, a post-processing device, etc.

Examples of the "liquid discharging apparatus" include, but are not limited to, an image forming apparatus serving as an apparatus configured to discharge a liquid composition and form an image over a sheet, and a three-dimensional object producing apparatus (stereoscopic object producing apparatus) configured to discharge an object producing liquid to a power layer formed of a powder placed in a layer state to produce a three-dimensional object (stereoscopic object).

The "liquid discharging apparatus" is not limited to those producing merely meaningful visible images such as texts and figures with liquid droplets discharged. For example, the liquid discharging apparatus can produce, for example, meaningless patterns and 3D images.

The "article to which the liquid composition can attach" means an article to which the liquid composition can attach at least temporarily, and to which the liquid composition attaches and adheres or attaches and permeates. Specific examples of the article to which the liquid composition can attach include, but are not limited to, recording media such as sheets of paper, recording sheets, recording sheets of paper, films, cloth, and wallpaper, electronic parts such as electronic substrates and piezoelectric elements, and media such as powder layers, organ models, and testing cells, and unless otherwise particularly specified, include all articles to which the liquid composition attaches.

The material of the "article to which the liquid composition can attach" needs at least to be a material that the liquid composition can attach at least temporarily, such as paper, yarn, fiber, fabric, leather, metals, plastics, glass, wood, and ceramics.

The "liquid composition" needs at least to have a viscosity and a surface tension that enable the liquid composition to be discharged from a liquid discharging head and is not particularly limited. However, it is preferable that the viscosity of the liquid composition become 30 mPa·s or lower at normal temperature and normal pressure or by heating or cooling. More specifically, the liquid composition is, for example, a solution, a suspension, or an emulsion containing, for example, a solvent such as water and an organic solvent, a colorant such as a dye and a pigment, a function imparting material such as a polymerizable compound, a resin, and a surfactant, a biocompatible material such as DNA, amino acid, protein, and calcium, and an edible material such as a natural pigment. Such a liquid composition can be used for uses such as an inkjet ink, a surface processing fluid, a liquid for forming a resist pattern for components of electronic elements and light-emitting elements and electronic circuits, and a material liquid for producing a three-dimensional object.

The "liquid discharging apparatus" is an apparatus in which the liquid discharging head and the article to which the liquid composition can attach relatively move. However, the liquid discharging apparatus is not limited to such an apparatus. Specific examples of the liquid discharging apparatus include, but are not limited to, a serial-type apparatus configured to move a liquid discharging head, and a line-type apparatus that does not move a liquid discharging head.

Other examples of the "liquid discharging apparatus" include, but are not limited to, a processing fluid coating apparatus configured to discharge a processing fluid to a sheet of paper in order to apply the processing fluid to the surface of the sheet of paper for, for example, reformation of the surface of the sheet of paper, and a jet granulator configured to discharge through nozzles, a composition liquid obtained by dispersing materials in a solution, to granulate particles of the materials.

The terms used in the present disclosure such as image formation, recording, printing, and object production represent the same meaning.

EXAMPLES

The present disclosure will be described more specifically below by way of Examples. The present disclosure should not be construed as being limited to these Examples.
(Production of Pigment Dispersion)
<White Pigment Dispersion Production Example 1>
—Preparation of White Pigment Dispersion Liquid A—

Titanium oxide (product name: TITANIX JR-301, obtained from Tayca Corporation) (45 g), a pigment dispersant TEGO DISPERS 651 (obtained from Evonik Industries AG) (10 g), and water (45 g) were mixed and subjected to dispersion treatment for 5 minutes using a bead mill (RE-SEARCH LAB, obtained from Shinmaru Enterprises Corporation) using zirconia beads having a diameter of 0.3 mm at a packing ratio of 60% at 8 m/s, to obtain a white pigment dispersion A having an effective component concentration of 45% by mass and a volume average particle diameter of 320 nm.

<White Pigment Dispersion Production Example 2>
—Preparation of White Pigment Dispersion Liquid B—

A white pigment dispersion liquid B having an effective component concentration of 45% by mass and a volume average particle diameter of 620 nm was prepared in the same manner as in White pigment dispersion production example 1, except that unlike in White pigment dispersion production example 1, titanium oxide (product name: TITANIX JR-301, obtained from Tayca Corporation) was changed to titanium oxide (product name: KR-380, obtained from Titan Kogyo, Ltd.).

<White Pigment Dispersion Production Example 3>
—Preparation of White Pigment Dispersion Liquid C—

A white pigment dispersion liquid C having an effective component concentration of 45% by mass and a volume average particle diameter of 180 nm was prepared in the same manner as in White pigment dispersion production example 1, except that unlike in White pigment dispersion production example 1, titanium oxide (product name: TITANIX JR-301, obtained from Tayca Corporation) was changed to titanium oxide (product name: R-42, obtained from Sakai Chemical Industry Co., Ltd.).

<Preparation Example of Polycarbonate Urethane Resin Particle Liquid 1>

A reaction container into which a stirrer, a reflux condenser, and a thermometer were inserted was charged with polycarbonate diol (a reaction product of 3-methyl-1,5-pentanediol and diphenyl carbonate) (with a number average molecular weight (Mn) of 1,200) (1,500 g), 2,2-dimethylol propionic acid (DMPA) (220 g), and N-methyl pyrrolidone (NMP) (1,347 g) under a nitrogen stream, and the materials were heated to 60 degrees C. to dissolve DMPA. Next, 4,4'-dicyclohexylmethane diisocyanate (1,445 g) (5.5 moles) and dibutyl tin dilaurate (catalyst) (2.6 g) were added to the resultant, and the resultant was heated to 90 degrees C. to allow the materials to undergo a urethanization reaction for 5 hours, to obtain a isocyanate-terminated urethane prepolymer. This reaction mixture was cooled to 80 degrees C., and triethylamine (149 g) was added and mixed with the resultant. The resultant was extracted by an amount of 4.340 g, and added to a mixture solution of water (5,400 g) and triethyl amine (15 g) under strong stirring. Next, ice (1,500 g) was added to the resultant, and a 35% by mass 1,6-hexamethylene diamine aqueous solution (626 g) was added to the resultant for chain elongation reaction. The solvent was evaporated from the resultant in a manner that the solid concentration would be 30% by mass, to obtain a polycarbonate urethane resin emulsion 1 having an alicyclic diisocyanate-derived structure. The resin (solid content) was isolated from the obtained polycarbonate urethane resin particle liquid 1, and a water dispersion having a resin solid concentration of 30% by mass was obtained as a sample for minimum filming temperature measurement. The minimum filming temperature (MFT) of the water dispersion measured with a "filming temperature tester" (obtained from Imoto Machinery Co., Ltd.) was 20 degrees C. Tg was 20 degrees C.

<Polycarbonate Urethane Resin Particle Liquid 2>

As a polycarbonate urethane resin particle liquid 2, a polycarbonate urethane resin (product name: SUPERFLEX 650, obtained from DKS Co., Ltd., with Tg of 5 degrees C.) was used at a resin solid concentration of 30% by mass.

<Preparation Example of Polyester Urethane Resin Particle Liquid>

In a container equipped with a thermometer, a nitrogen gas introducing pipe, and a stirrer and purged with nitrogen, polyester polyol (product name: POLYLITE OD-X-2251, obtained from DIC Corporation, with an average molecular weight of 2,000) (200.4 g), 2,2-dimethylol propionic acid (15.7 g), isophorone diisocyanate (48.0 g), and methyl ethyl ketone (77.1 g) serving as an organic solvent were allowed to undergo reaction using dibutyl tin dilaurate (DMTDL) (0.06 g) as a catalyst. The reaction was continued for 4 hours, and subsequently methyl ethyl ketone (30.7 g) serving as a diluting solvent was supplied to the resultant, to further continue the reaction.

When the average molecular weight of the obtained reaction product reached the range of from 20,000 through 60,000, methanol (1.4 g) was added to the resultant to terminate the reaction, to obtain a urethane resin organic solvent solution. A 48% by mass potassium hydroxide aqueous solution (13.4 g) was added to the urethane resin organic solvent solution, to neutralize the carboxyl group contained in the urethane resin. Next, water (715.3 g) was added to the resultant, and the resultant was stirred sufficiently, and then aged and desolventized, to obtain a polyester urethane resin particle liquid having a solid concentration of 25% by mass. Tg of the obtained polyester urethane resin particle liquid measured in the same manner as the polycarbonate urethane resin particle liquid 1 was 74 degrees C.

Example 1

The white pigment dispersion A (45% by mass), 1,3-butanediol (product name: 1,3-BUTANEDIOL, obtained from Daicel Chemical Corporation) (15% by mass), 3-methoxy-N,N-dimethyl propionamide (product name: ECAMIDE M-100, obtained from Idemitsu Kosan Co., Ltd.) (10% by mass), the polycarbonate urethane resin particle liquid 2 (with a solid concentration of 30% by mass and Tg of 5 degrees C.) (2% by mass), the polyester urethane resin particle liquid (with a solid concentration of 25% by mass) (20% by mass), a siloxane compound (product name: FZ2110, obtained from Dow Corning Toray Co., Ltd.) (3% by mass), and ion-exchanged water as a balance (for the total of 100% by mass) were mixed and stirred, and subsequently filtrated through a membrane filter having an average pore diameter of 0.8 micrometers (product name: DISMIC-25CS, obtained from Advantec Co. Ltd.), to obtain a white ink 1.

Example 2

The white pigment dispersion A (45% by mass), 1,3-butanediol (product name: 1,3-BUTANEDIOL, obtained from Daicel Chemical Corporation) (25% by mass), the polycarbonate urethane resin particle liquid 1 obtained according to Preparation example (with a solid concentration of 30% by mass and Tg of 20 degrees C.) (15% by mass), the polyester urethane resin particle liquid (with a solid concentration of 25% by mass) (10% by mass), a siloxane compound (product name: FZ2110, obtained from Dow Corning Toray Co., Ltd.) (3% by mass), and ion-exchanged water as a balance (for the total of 100% by mass) were mixed and stirred, and subsequently filtrated through a membrane filter having an average pore diameter of 0.8 micrometers (product name: DISMIC-25CS, obtained from Advantec Co., Ltd.), to obtain a white ink 2.

Examples 3 to 8 and Comparative Examples 1 to 11

White inks 3 to 8 of Examples 3 to 8 and white inks a to k of Comparative Examples 1 to 11 were obtained according to the prescriptions of Tables 1 and 2.

Next, using the inkjet discharging apparatus of FIG. 10 including the liquid discharging head having the circulation mechanism illustrated in FIG. 1 to FIG. 9 and a fine driving mechanism, the white ink 1 of Example 1 was discharged by a single-pass printing method to a PET film (product name: TP-188, obtained from Kimoto Co., Ltd.) to have an average thickness of 10 micrometers, to obtain a printed matter 1 of Example 1.

In Examples 2 to 8 and Comparative Examples 1 to 8 and 11, printed matters 2 to 8 of Examples 2 to 8 and printed matters a to h and k of Comparative Examples 1 to 8 and 11 were obtained in the same manner as in Example 1, except that the white inks 2 to 8 and the white inks a to h and k were used instead of the white ink 1.

Using an inkjet discharging apparatus (including no circulation mechanism) mounted with a GEN5 head (obtained from Ricoh Printing Systems Ltd.), the white inks i and j of Comparative Examples 9 and 10 were discharged by a single-pass printing method to a PET film (product name: TP-188, obtained from Kimoto Co., Ltd.) to have an average thickness of 10 micrometers, to obtain printed matters i and j of Comparative Examples 9 and 10.

Next, various properties of the obtained white inks and printed matters were evaluated in the manners described below. The results are presented in Tables 1 to 3.

<Hiding Power>

The hiding power of each printed matter produced was evaluated with a reflective colorimeter X-RITE 939 (obtained from X-Rite, Inc.).

Specifically, the hiding ratio was obtained according to JIS K 5600_4_ln, and the hiding power was evaluated according to the criteria described below.

[Evaluation Criteria]
A: The hiding ratio was less than 0.15.
B: The hiding ratio was 0.15 or greater but less than 0.18.
C: The hiding ratio was 0.18 or greater but less than 0.2.
D: The hiding ratio was 0.2 or greater.

<Discharging Stability>

Using an inkjet discharging apparatus of FIG. 10 including the liquid discharging head having the circulation mechanism illustrated in FIG. 1 to FIG. 9 and a fine driving mechanism, the white inks 1 to 6 of Examples 1 to 6 and the printed matters a to h and k of Comparative Examples 1 to 8 and 11 were printed by a single-pass printing method at a resolution of 600 dpi over a hundred sheets continuously, to evaluate discharging disorder and discharging failure according to the criteria described below.

Using an inkjet discharging apparatus mounted with a GEN5 head (obtained from Ricoh Printing Systems Ltd.), the white inks i and j of Comparative Examples 9 and 10 were printed by a single-pass printing method by one pass at a resolution of 600 dpi over a hundred sheets continuously, to observe evaluate discharging disorder and discharging failure and evaluate discharging stability according to the criteria described below.

[Evaluation Criteria]
A: No discharging disorder and discharging failure were observed at all.
B: Discharging disorder and discharging failure were observed at ten or less nozzles.
C: Discharging disorder and discharging failure were observed at 30 or less nozzles.
D: Discharging disorder and discharging failure were observed at 50 or more nozzles.

<Adhesiveness>

The solid portions of the obtained images (printed matters) on the produced printed matters were cut into with a cutter knife in a grid pattern at 1 mm intervals according to JIS K5600, peeled away with an adhesive cellophane tape (product name: SCOTCH MENDING TAPE (18 mm), obtained from 3M Japan Limited), and observed with a magnifying glass (product name: PEAK No. 1961(×10), obtained from Tokai Sangyo Co., Ltd.) to evaluate "adhesiveness" of the base material according to the evaluation criteria described below compliant with JIS K5600 cross-cut test.

[Evaluation Criteria]
A: The rank classification of JIS K5600 cross-cut evaluation was Level 0.
B: The rank classification of JIS K5600 cross-cut evaluation was Level 1.
C: The rank classification of JIS K5600 cross-cut evaluation was Level 2 to 3.
D: The rank classification of JIS K5600 cross-cut evaluation was Level 4 or inferior.

TABLE 1

|  |  | Ex | | | | | | | |
| --- | --- | --- | --- | --- | --- | --- | --- | --- | --- |
|  |  | 1 | 2 | 3 | 4 | 5 | 6 | 7 | 8 |
| Coloring material | White pigment dispersion liquid A | 45 | 45 | 65 | 65 | — | — | 55 | 55 |
|  | White pigment dispersion liquid B | — | — | — | — | 45 | 65 | — | — |
|  | White pigment dispersion liquid C | — | — | — | — | — | — | — | — |
| Organic solvent | 1,2-Propanediol | 15 | 25 | 10 | 15 | 15 | 10 | 10 | 15 |
|  | 3-Methoxy-N'N-dimethylpropaneamide | 10 | — | 5 | — | 10 | 5 | 5 | — |
| Urethane resin particles | Polycarbonate urethane resin particle liquid 1 | — | 15 | — | 2 | — | — | — | 10 |
|  | Polycarbonate urethane resin particle liquid 2 | 2 | — | 2 | — | 2 | 2 | 2 | — |

TABLE 1-continued

|  |  | Ex |  |  |  |  |  |  |  |
|---|---|---|---|---|---|---|---|---|---|
|  |  | 1 | 2 | 3 | 4 | 5 | 6 | 7 | 8 |
|  | Polyester urethane resin particle liquid | 20 | 10 | 10 | 10 | 20 | 10 | 20 | 10 |
| Surfactant | Siloxane compound | 3 | 3 | — | 3 | 3 | — | 3 | 3 |
| Water | Ion-exchanged water | Balance | Balance | Balance | Balance | Balance | Balance | Balance | Balance |
|  | Total (% by mass) | 100 | 100 | 100 | 100 | 100 | 100 | 100 | 100 |
|  | Pigment concentration (% by mass) | 20.3 | 20.3 | 29.3 | 29.3 | 20.3 | 29.3 | 24.8 | 24.8 |
|  | Evaluated head | Circulation | Circulation | Circulation | Circulation | Circulation | Circulation | Circulation | Circulation |
|  | Volume average particle diameter of titanium oxide (nm) | 320 | 320 | 320 | 320 | 620 | 620 | 320 | 320 |
|  | Hiding power | B | B | A | A | C | C | A | A |
|  | Discharging stability | A | A | A | A | A | A | A | A |
|  | Adhesiveness | A | A | B | B | A | A | A | A |

TABLE 2

|  |  | Comp. Ex |  |  |  |  |  |
|---|---|---|---|---|---|---|---|
|  |  | 1 | 2 | 3 | 4 | 5 | 6 |
| Coloring material | White pigment dispersion liquid A | 25 | 25 | 70 | 70 | — | — |
|  | White pigment dispersion liquid B | — | — | — | — | 30 | 70 |
|  | White pigment dispersion liquid C | — | — | — | — | — | — |
| Organic solvent | 1,2-Propanediol | 15 | 25 | 10 | 15 | 10 | 15 |
|  | 3-Methoxy-N'N-dimethylpropaneamide | 10 | — | 5 | — | 5 | — |
| Urethane resin particles | Polycarbonate urethane resin particle liquid 1 | — | 15 | — | 2 | — | 2 |
|  | Polycarbonate urethane resin particle liquid 2 | 2 | — | 2 | — | 2 | — |
|  | Polyester urethane resin particle liquid | 20 | 10 | 10 | 10 | 20 | 10 |
| Surfactant | Silaxane compound | 3 | 3 | — | 3 | 3 | 3 |
| Water | Ion-exchanged water | Balance | Balance | Balance | Balance | Balance | Balance |
|  | Total (% by mass) | 100 | 100 | 100 | 100 | 100 | 100 |
|  | Pigment concentration (% by mass) | 11.3 | 11.3 | 31.5 | 31.5 | 13.5 | 31.5 |
|  | Evaluated head | Circulation | Circulation | Circulation | Circulation | Circulation | Circulation |
|  | Volume average particle diameter of titanium oxide (nm) | 320 | 320 | 320 | 320 | 620 | 620 |
|  | Hiding power | D | D | D | D | D | D |
|  | Discharging stability | A | A | D | D | A | A |
|  | Adhesiveness | A | A | B | B | A | A |

TABLE 3

|  |  | Comp. Ex |  |  |  |  |
|---|---|---|---|---|---|---|
|  |  | 7 | 8 | 9 | 10 | 11 |
| Coloring material | White pigment dispersion liquid A | — | — | 55 | 55 | 45 |
|  | White pigment dispersion liquid B | — | — | — | — | — |
|  | White pigment dispersion liquid C | 45 | 45 | — | — | — |
| Organic solvent | 1,2-Propanediol | 10 | 15 | 10 | 15 | 15 |
|  | 3-Methoxy-N'N-dimethylpropaneamide | 5 | — | 5 | — | 10 |

TABLE 3-continued

|  |  | Comp. Ex | | | | |
| --- | --- | --- | --- | --- | --- | --- |
|  |  | 7 | 8 | 9 | 10 | 11 |
| Urethane resin particles | Polycarbonate urethane resin particle liquid 1 | — | 10 | — | 10 | — |
|  | Polycarbonate urethane resin particle liquid 2 | 2 | — | 2 | — | — |
|  | Polyester urethane resin particle liquid | 20 | 10 | 20 | 10 | 20 |
| Surfactant | Sitaxane compound | 3 | 3 | 3 | 3 | 3 |
| Water | Ion-exchanged water | Balance | Balance | Balance | Balance | Balance |
|  | Total (% by mass) | 100 | 100 | 100 | 100 | 100 |
| Pigment concentration (% by mass) | | 20.3 | 20.3 | 24.8 | 24.8 | 11.3 |
| Evaluated head | | Circulation | Circulation | Normal | Normal | Circulation |
| Volume average particle diameter of titanium oxide (nm) | | 180 | 180 | 320 | 320 | 320 |
| Hiding power | | D | D | D | D | A |
| Dischargiag stability | | A | A | D | D | A |
| Adhesiveness | | A | A | A | A | D |

Aspects of the present disclosure are, for example, as follows.

<1> A liquid discharging apparatus including:
a storage storing an ink, the ink containing water, an organic solvent, at least two kinds of urethane resins, and titanium oxide, and
a liquid discharging head including:
an individual liquid chamber having a circulation flow path through which the ink is circulated, and
a nozzle communicating with the individual liquid chamber and through which a liquid droplet of the ink is discharged,
wherein a content of the titanium oxide in the ink is 20% by mass or greater but 30% by mass or less, and
a volume average particle diameter of the titanium oxide is 300 nm or greater but 630 nm or less.

<2> The liquid discharging apparatus according to <1>,
wherein the urethane resins contain a polycarbonate urethane resin having a glass transition temperature of lower than 25 degrees C.

<3> The liquid discharging apparatus according to <1> or <2>,
wherein the liquid discharging head further includes:
a pressure sensor configured to detect pressure of the ink; and
a circulation speed control unit configured to control a circulation speed of the ink,
wherein the circulation speed control unit increases the circulation speed of the ink when a detected value of the pressure sensor is higher than a predetermined value.

<4> The liquid discharging apparatus according to <3>,
wherein the liquid discharging head further includes a piezo element configured to cause the liquid droplet to be discharges from the nozzle, and
the piezo element is formed integrally with the pressure sensor.

<5> The liquid discharging apparatus according to <4>,
wherein the piezo element applies in an ink discharging direction, a load of a level at which the ink is not discharged, to detect the pressure.

<6> The liquid discharging apparatus according to <5>,
wherein the circulation speed control unit controls the circulation speed of the ink while the liquid discharging head is not discharging the ink.

<7> A liquid discharging method including:
circulating an ink containing water, an organic solvent, at least two kinds of urethane resins, and titanium oxide in an individual liquid chamber and discharging a liquid droplet of the liquid composition through a nozzle of a liquid discharging head,
wherein a content of the titanium oxide in the ink is 20% by mass or greater but 30% by mass or less, and
a volume average particle diameter of the titanium oxide is 300 nm or greater but 630 nm or less.

The liquid discharging apparatus according to any one of <1> to <6> can solve the various problems in the related art and achieve the object of the present disclosure.

The liquid discharging method according to <7> aims for solving the various problems in the related art and achieving an object described below. That is, the liquid discharging method has an object to provide a liquid discharging method that has an excellent hiding power and a high printing stability even when a single-pass printing method is used.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharging apparatus, comprising:
a storage storing an ink, the ink containing water, an organic solvent, at least two kinds of urethane resins, and titanium oxide; and
a liquid discharging head including:
an individual liquid chamber having a circulation flow path through which the ink is circulated,
a nozzle communicating with the individual liquid chamber and through which a liquid droplet of the ink is discharged,
wherein a content of the titanium oxide in the ink is 20% by mass or greater but 30% by mass or less,
a volume average particle diameter of the titanium oxide is 300 nm or greater but 630 nm or less, and
wherein the urethane resins comprise a (i) polycarbonate urethane resin having a glass transition temperature of lower than 25 degrees C. and (ii) polyester urethane resin.

2. The liquid discharging apparatus according to claim 1, further comprising:
a pressure sensor configured to detect pressure of the ink; and
a circulation speed control unit configured to control a circulation speed of the ink,
wherein the circulation speed control unit increases the circulation speed of the ink when a detected value of the pressure sensor is higher than a predetermined value.

3. The liquid discharging apparatus according to claim 2, wherein the liquid discharging head further includes a piezo element configured to cause the liquid droplet to be discharged from the nozzle, and
the piezo element is formed integrally with the pressure sensor.

4. The liquid discharging apparatus according to claim 3, wherein the piezo element applies in an ink discharging direction, a load of a level at which the ink is not discharged, to detect the pressure.

5. The liquid discharging apparatus according to claim 4, wherein the circulation speed control unit controls the circulation speed of the ink while the liquid discharging head is not discharging the ink.

6. The liquid discharging apparatus according to claim 1, wherein the content of the titanium oxide in the ink is 22.5% by mass or greater but 27.5% by mass or less, and the volume average particle diameter of the titanium oxide is 300 nm or greater but 500 nm or less.

7. The liquid discharging apparatus according to claim 6, wherein the total content of the urethane resins is 15% by mass or greater but 25% by mass or less relative to the total amount of the ink.

8. The liquid discharging apparatus according to claim 7, wherein the content of the water is 20% by mass or greater but 60% by mass or less relative to the total amount of the ink.

9. The liquid discharging apparatus according to claim 8, wherein the content of organic solvent is 5 to 25% by mass relative to the total amount of the ink.

10. The liquid discharging apparatus according to claim 1, wherein the total content of the urethane resins is 10% by mass or greater but 30% by mass or less relative to the total amount of the ink.

11. The liquid discharging apparatus according to claim 1, wherein the total content of the urethane resins is 15% by mass or greater but 25% by mass or less relative to the total amount of the ink.

12. The liquid discharging apparatus according to claim 1, wherein the content of the water is 10% by mass or greater but 90% by mass or less relative to the total amount of the ink.

13. The liquid discharging apparatus according to claim 1, wherein the content of the water is 20% by mass or greater but 60% by mass or less relative to the total amount of the ink.

14. The liquid discharging apparatus according to claim 1, wherein the content of organic solvent is 5 to 25% by mass relative to the total amount of the ink.

15. A liquid discharging method, comprising:
circulating an ink containing water, an organic solvent, at least two kinds of urethane resins, and titanium oxide in an individual liquid chamber and discharging a liquid droplet of the ink through a nozzle of a liquid discharging head,
wherein a content of the titanium oxide in the ink is 20% by mass or greater but 30% by mass or less,
a volume average particle diameter of the titanium oxide is 300 nm or greater but 630 nm or less, and
wherein the urethane resins comprise a (i) polycarbonate urethane resin having a glass transition temperature of lower than 25 degrees C. and a (ii) polyester urethane resin.

* * * * *